US009442186B2

(12) United States Patent
Payne et al.

(10) Patent No.: US 9,442,186 B2
(45) Date of Patent: Sep. 13, 2016

(54) INTERFERENCE REDUCTION FOR TOF SYSTEMS

(71) Applicant: Microsoft Corporation, Redmond, WA (US)

(72) Inventors: Andrew Payne, Mountain View, CA (US); Cyrus Bamji, Fremont, CA (US); Dawson Yee, Medina, WA (US); Barry Thompson, Menlo Park, CA (US); Zhanping Xu, Sunnyvale, CA (US); Brock Roland, San Francisco, CA (US); Larry Prather, Boulder Creek, CA (US); Travis Perry, Menlo Park, CA (US); Mike Fenton, Palo Alto, CA (US); Sunil Acharya, Cupertino, CA (US); Algird Gudaitis, Fall City, WA (US); Matthew Morris, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/055,660

(22) Filed: Oct. 16, 2013

(65) Prior Publication Data
US 2014/0333917 A1    Nov. 13, 2014

Related U.S. Application Data

(60) Provisional application No. 61/822,873, filed on May 13, 2013.

(51) Int. Cl.
*G01C 3/08* (2006.01)
*G01S 7/493* (2006.01)
(Continued)

(52) U.S. Cl.
CPC ............... *G01S 7/493* (2013.01); *G01S 17/36* (2013.01); *G01S 17/87* (2013.01); *G01S 17/89* (2013.01)

(58) Field of Classification Search
CPC ........ G01S 17/10; G01S 7/497; G01S 7/487; G01S 17/89; G01S 17/36; G01S 17/87; G01S 7/493; G01C 3/08
See application file for complete search history.

(56) References Cited

U.S. PATENT DOCUMENTS 4,492,473 A * 1/1985 Richter et al. ............... 356/640
4,627,620 A 12/1986 Yang
(Continued)

FOREIGN PATENT DOCUMENTS

CN      101254344 B     6/2010
DE   102006050303 A1    6/2007
(Continued)

OTHER PUBLICATIONS

Miles Hansard, Seungkyu Lee, Ouk Choi, Radu Horaud. Time of Flight Cameras: Principles, Methods, and Applications. Springer, pp. 95, 2012, SpringerBriefs in Computer Science, ISBN 978-1-4471-4658-2. <10.1007/978-1-4471-4658-2>.*

(Continued)

*Primary Examiner* — Luke Ratcliffe
*Assistant Examiner* — Samantha K Abraham
(74) *Attorney, Agent, or Firm* — Gregg Wisdom; Judy Yee; Micky Minhas

(57) ABSTRACT

Embodiments disclosed herein are directed to time-of-flight (TOF) systems, and methods for use therewith, that substantially reduce interference that the TOF system may cause to at least one other system that is configured to wirelessly receive and respond to IR light signals. Some such embodiments involve emitting IR light having a low frequency (LF) power envelope that is shaped to substantially reduce frequency content within at least one frequency range known to be used by at least one other system that may be in close proximity to the TOF system. Such embodiments can also involve detecting at least a portion of the emitted RF modulated IR light that has reflected off one or more objects. A TOF system can produce depth images in dependence on results of the detecting, as well as update an application in dependence on the depth images.

20 Claims, 14 Drawing Sheets

(51) Int. Cl.
   *G01S 17/36* (2006.01)
   *G01S 17/87* (2006.01)
   *G01S 17/89* (2006.01)

(56) References Cited

U.S. PATENT DOCUMENTS

| | | | |
|---|---|---|---|
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,148,154 A | 9/1992 | MacKay et al. | |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,278,923 A * | 1/1994 | Nazarathy et al. | 385/3 |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,495,576 A | 2/1996 | Ritchey | |
| 5,516,105 A | 5/1996 | Eisenbrey et al. | |
| 5,524,637 A | 6/1996 | Erickson et al. | |
| 5,534,917 A | 7/1996 | MacDougall | |
| 5,563,988 A | 10/1996 | Maes et al. | |
| 5,577,981 A | 11/1996 | Jarvik | |
| 5,580,249 A | 12/1996 | Jacobsen et al. | |
| 5,594,469 A | 1/1997 | Freeman et al. | |
| 5,597,309 A | 1/1997 | Riess | |
| 5,616,078 A | 4/1997 | Oh | |
| 5,617,312 A | 4/1997 | Iura et al. | |
| 5,638,300 A | 6/1997 | Johnson | |
| 5,641,288 A | 6/1997 | Zaenglein | |
| 5,682,196 A | 10/1997 | Freeman | |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,875,108 A | 2/1999 | Hoffberg et al. | |
| 5,877,803 A | 3/1999 | Wee et al. | |
| 5,913,727 A | 6/1999 | Ahdoot | |
| 5,933,125 A | 8/1999 | Fernie | |
| 5,980,256 A | 11/1999 | Carmein | |
| 5,989,157 A | 11/1999 | Walton | |
| 5,995,649 A | 11/1999 | Marugame | |
| 6,005,548 A | 12/1999 | Latypov et al. | |
| 6,009,210 A | 12/1999 | Kang | |
| 6,054,991 A | 4/2000 | Crane et al. | |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,098,458 A | 8/2000 | French et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A | 10/2000 | Kunz | |
| 6,141,463 A | 10/2000 | Covell et al. | |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,188,777 B1 | 2/2001 | Darrell et al. | |
| 6,215,890 B1 | 4/2001 | Matsuo et al. | |
| 6,215,898 B1 | 4/2001 | Woodfill et al. | |
| 6,226,396 B1 | 5/2001 | Marugame | |
| 6,229,913 B1 | 5/2001 | Nayar et al. | |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,363,160 B1 | 3/2002 | Bradski et al. | |
| 6,384,819 B1 | 5/2002 | Hunter | |
| 6,411,744 B1 | 6/2002 | Edwards | |
| 6,430,997 B1 | 8/2002 | French et al. | |
| 6,476,834 B1 | 11/2002 | Doval et al. | |
| 6,496,598 B1 | 12/2002 | Harman | |
| 6,503,195 B1 | 1/2003 | Keller et al. | |
| 6,515,740 B2 | 2/2003 | Bamji et al. | |
| 6,539,931 B2 | 4/2003 | Trajkovic et al. | |
| 6,570,555 B1 | 5/2003 | Prevost et al. | |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,681,031 B2 | 1/2004 | Cohen et al. | |
| 6,714,665 B1 | 3/2004 | Hanna et al. | |
| 6,731,799 B1 | 5/2004 | Sun et al. | |
| 6,738,066 B1 | 5/2004 | Nguyen | |
| 6,765,726 B2 | 7/2004 | French et al. | |
| 6,788,809 B1 | 9/2004 | Grzeszczuk et al. | |
| 6,801,637 B2 | 10/2004 | Voronka et al. | |
| 6,873,723 B1 | 3/2005 | Aucsmith et al. | |
| 6,876,496 B2 | 4/2005 | French et al. | |
| 6,937,742 B2 | 8/2005 | Roberts et al. | |
| 6,950,534 B2 | 9/2005 | Cohen et al. | |
| 7,003,134 B1 | 2/2006 | Covell et al. | |
| 7,036,094 B1 | 4/2006 | Cohen et al. | |
| 7,038,855 B2 | 5/2006 | French et al. | |
| 7,039,676 B1 | 5/2006 | Day et al. | |
| 7,042,440 B2 | 5/2006 | Pryor et al. | |
| 7,050,606 B2 | 5/2006 | Paul et al. | |
| 7,058,204 B2 | 6/2006 | Hildreth et al. | |
| 7,060,957 B2 | 6/2006 | Lange et al. | |
| 7,113,918 B1 | 9/2006 | Ahmad et al. | |
| 7,121,946 B2 | 10/2006 | Paul et al. | |
| 7,170,492 B2 | 1/2007 | Bell | |
| 7,184,048 B2 | 2/2007 | Hunter | |
| 7,202,898 B1 | 4/2007 | Braun et al. | |
| 7,222,078 B2 | 5/2007 | Abelow | |
| 7,227,526 B2 | 6/2007 | Hildreth et al. | |
| 7,259,747 B2 | 8/2007 | Bell | |
| 7,308,112 B2 | 12/2007 | Fujimura et al. | |
| 7,317,836 B2 | 1/2008 | Fujimura et al. | |
| 7,348,963 B2 | 3/2008 | Bell | |
| 7,359,121 B2 | 4/2008 | French et al. | |
| 7,367,887 B2 | 5/2008 | Watabe et al. | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,405,812 B1 | 7/2008 | Bamji | |
| 7,412,077 B2 | 8/2008 | Li et al. | |
| 7,421,093 B2 | 9/2008 | Hildreth et al. | |
| 7,430,312 B2 | 9/2008 | Gu | |
| 7,436,496 B2 | 10/2008 | Kawahito | |
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,489,812 B2 | 2/2009 | Fox et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |

(56) References Cited

U.S. PATENT DOCUMENTS

| | | | |
|---|---|---|---|
| 7,574,020 | B2 | 8/2009 | Shamaie |
| 7,576,727 | B2 | 8/2009 | Bell |
| 7,590,262 | B2 | 9/2009 | Fujimura et al. |
| 7,593,552 | B2 | 9/2009 | Higaki et al. |
| 7,598,942 | B2 | 10/2009 | Underkoffler et al. |
| 7,607,509 | B2 | 10/2009 | Schmiz et al. |
| 7,620,202 | B2 | 11/2009 | Fujimura et al. |
| 7,668,340 | B2 | 2/2010 | Cohen et al. |
| 7,680,298 | B2 | 3/2010 | Roberts et al. |
| 7,683,954 | B2 | 3/2010 | Ichikawa et al. |
| 7,684,592 | B2 | 3/2010 | Paul et al. |
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2002/0083474 | A1* | 6/2002 | Hennenhoefer ....... H04H 20/63 725/143 |
| 2003/0151453 | A1* | 8/2003 | Laletin ......................... 327/551 |
| 2005/0024259 | A1* | 2/2005 | Berry et al. ................. 342/124 |
| 2005/0195383 | A1* | 9/2005 | Breed et al. ................. 356/4.01 |
| 2007/0104015 | A1* | 5/2007 | Srinivas et al. .............. 365/233 |
| 2008/0026838 | A1 | 1/2008 | Dunstan et al. |
| 2008/0057881 | A1* | 3/2008 | Dwyer .......................... 455/108 |
| 2010/0110280 | A1 | 5/2010 | Aoyama |
| 2010/0214214 | A1 | 8/2010 | Corson et al. |
| 2010/0290054 | A1* | 11/2010 | Cho .............................. 356/451 |
| 2011/0037849 | A1 | 2/2011 | Niclass et al. |
| 2012/0017153 | A1 | 1/2012 | Matsuda et al. |
| 2012/0065494 | A1* | 3/2012 | Gertner et al. ............... 600/411 |
| 2012/0082346 | A1 | 4/2012 | Katz et al. |
| 2012/0098964 | A1 | 4/2012 | Oggier et al. |
| 2012/0313900 | A1* | 12/2012 | Dahl ....................... G06F 3/043 345/177 |
| 2013/0181119 | A1 | 7/2013 | Bikumandla et al. |

FOREIGN PATENT DOCUMENTS

| | | |
|---|---|---|
| EP | 0583061 A2 | 2/1994 |
| EP | 1647839 A2 | 4/2006 |
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

DigitalHome. "Bell TV Update for 9242 HD PVR Fixes IR Interference Bug." Digital Home Website. Feb. 5, 2010. http://www.digitalhome.ca/2010/02/bell-tv-update-for-9242-hd-pvr-fixes-ir-interference-bug/.*

Dietz, Christian, et al., "Infrared Reflectography Using 3D Laser Scanning," e-Conservation Magazine, Issue 18, Mar. 13, 2011, 6 pages.

Infrared Receivers for 3D Active Glasses, [http://www.vishay.com/docs/49150/vmn-sg21.pdf], Jun. 12, 2012, 4 pages.

Wu, Martin K., "Interference Problems of Fluorescent Lamps Operating on High Frequency Electronic Ballasts with Infrared Remote Control Equipment and Infrared Simultaneous Interpretation System," Energy Efficient Office, Electrical and Mechanical Services Dept., Aug. 2003, 8 pages.

Moreira, A.J.C., et al., "Performance of infrared transmission systems under ambient light interference," IEEE Proceedings of Optoelectronics, vol. 143, Issue 6, Dec. 1996, 8 pages.

Gokturk, S. Burak, "A Time-of-Flight Depth Sensor—System Description, Issues and Solutions," Conference on Computer Vision and Pattern Recognition Workshop, Jun. 2004, 9 pages.

Mistele, Thomas, et al., "Choosing an Infrared Receiver Based on AGC Type," Vishay Semiconductors, published in Wireless Design & Development, Nov. 2008, 2 pages.

"Circuit Description of the IR Receiver Modules," Vishay Semiconductors, Document No. 80069, Feb. 27, 2013, 2 pages.

International Search Report & Written Opinion mailed Sep. 10, 2014, in PCT Patent Application No. PCT/US2014/037753 filed May 13, 2014.

Mure-Dubois, et al., "Fusion of Time of Flight Camera Point Clouds", In Workshop on Multi-Camera and Multi-Modal Sensor Fusion Algorithms and Applications, Oct. 1, 2008, 12 pages.

"SwissRanger SR-3000 Manual", Version 1.02, Published on: Oct. 2006, Available at: https://aiweb.techfak.uni-bielefeld.de/files/SR3000_manual_V1.03.pdf.

Amendment filed Nov. 17, 2014, in PCT Patent Application No. PCT/US2014/037753 filed May 13, 2014.

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shag et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

(56) References Cited

OTHER PUBLICATIONS

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, Vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

Written Opinion mailed Mar. 20, 2015, in PCT Patent Application No. PCT/US2014/037753 filed May 13, 2014.

International Preliminary Report on Patentability mailed Jun. 30, 2015, in PCT Patent Application No. PCT/US2014/037753 filed May 13, 2014.

* cited by examiner

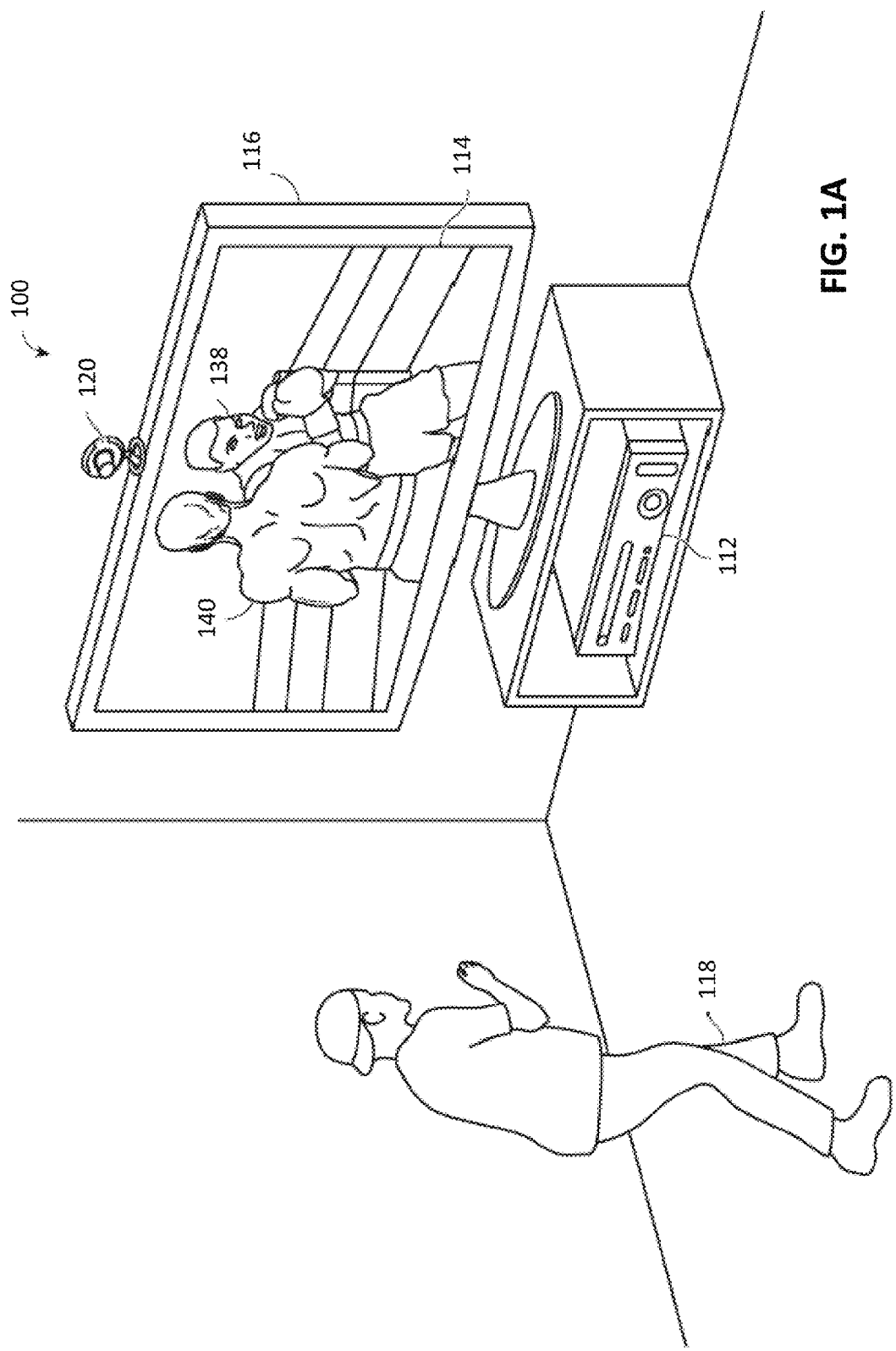

FIG. 6

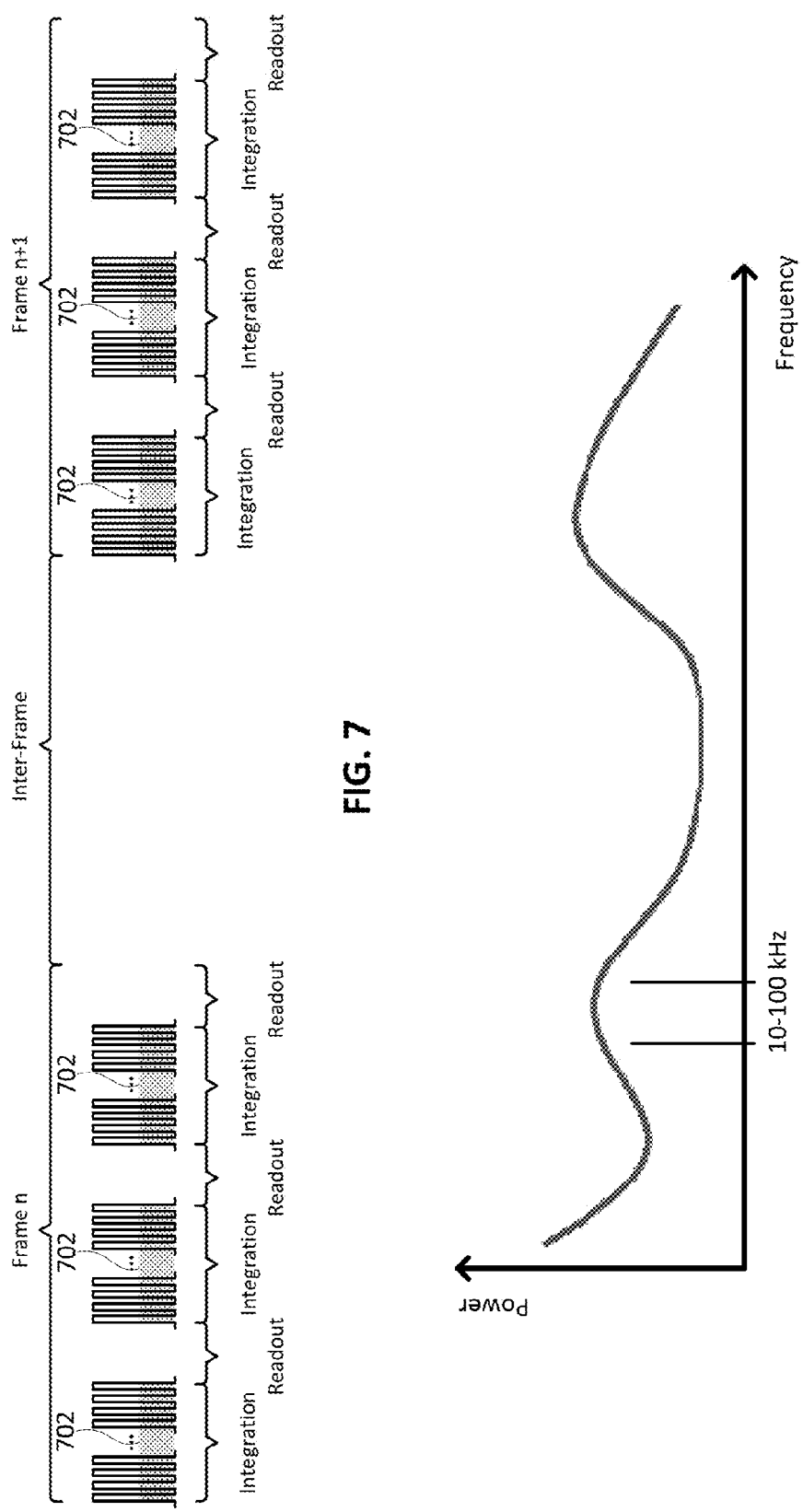

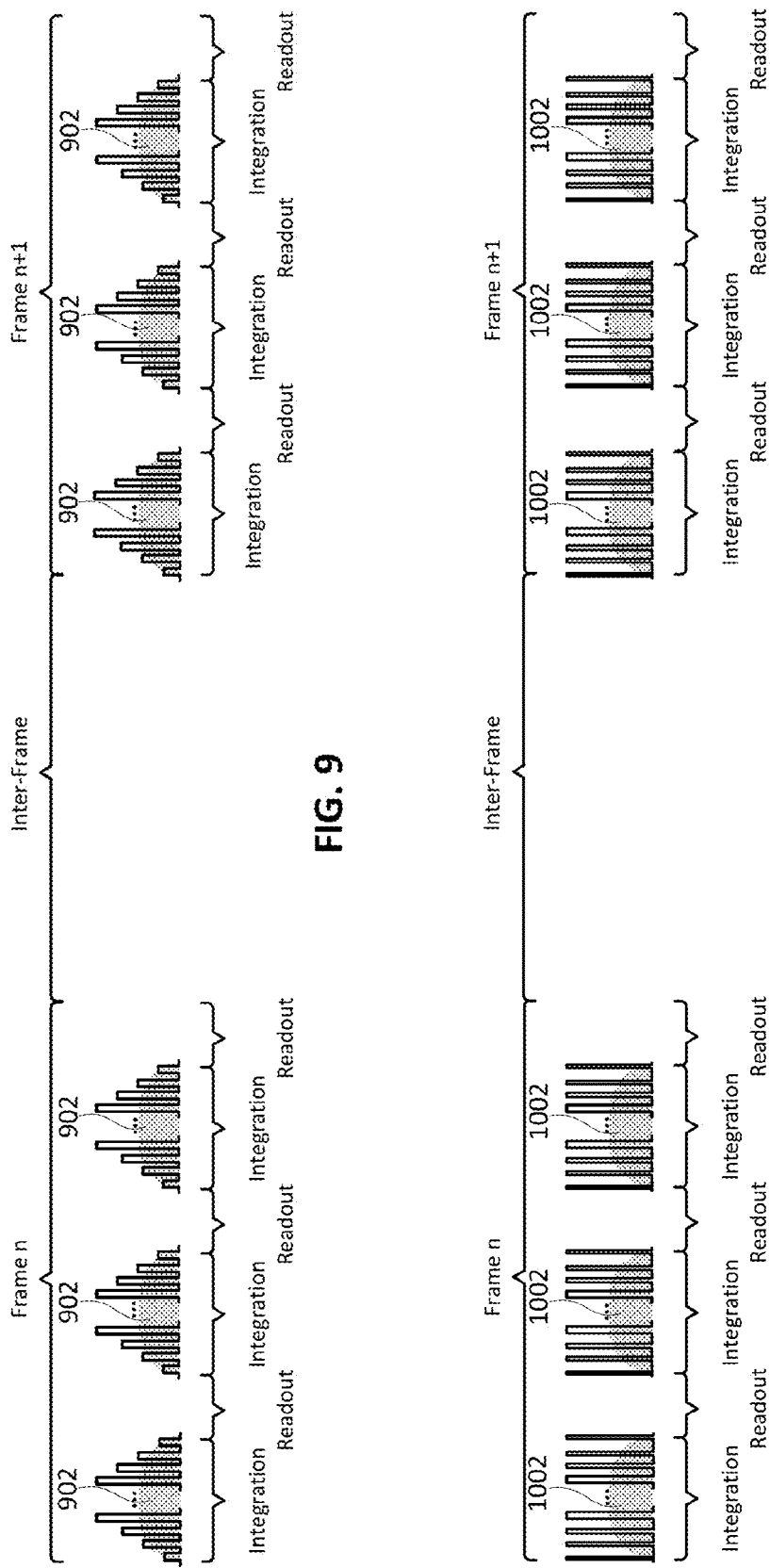

INTERFERENCE REDUCTION FOR TOF SYSTEMS

PRIORITY CLAIM

This application claims priority to U.S. Provisional Patent Application No. 61/822,873, filed May 13, 2013, which is incorporated herein by reference.

BACKGROUND

Various consumer electronic devices, such as televisions, set top boxes and media players, are configured to be remotely controlled by handheld remote control devices that transmit modulated infrared (IR) remote control signals. Such IR remote control signals typically have a wavelength of about 940 nm and typically have a carrier frequency between 10 kHz and 100 kHz, and even more specifically between 30 kHz and 60 kHz. For an even more specific example, many IR remote control signals have a carrier frequency of about 36 kHz (this is not to be confused with the actual frequency of the IR light itself).

A time-of-flight (TOF) camera, which can also be referred to as a TOF system, may be located in close proximity to (e.g., within the same room as) one or more of the aforementioned consumer electronic devices (e.g., a television, a set top box and/or a media player) that is/are configured to be remotely controlled by a handheld remote control device. For example, a TOF camera may be part of a gaming console that is within the same room as a television, a set top box and/or a DVD player, which can also be referred to as other systems. Such a TOF camera typically operates by illuminating a target with a modulated IR light source and detecting IR light that reflects off the target and is incident on an image pixel detector array of the TOF camera. The IR light source is usually modulated at a relatively high carrier frequency (e.g., about 100 MHz, which is within the radio frequency range) during integration and is typically switched off between frames or captures and during readout. While the carrier frequency of the modulated IR light source is typically well above the carrier frequency of remote control signals, transitions from times during which the light source does not emit the RF modulated light to times during which the light source emits RF modulated light, and vice versa, can produce lower frequency content that can interfere with the remote control signals. Explained another way, a low frequency (LF) power envelope associated with the modulated IR light, produced by the TOF camera, may interfere with remote control signals intended to control another system (e.g., a television) within close proximity to the TOF camera. A vast majority of the interference produced by the TOF camera will not correspond to a valid remote control command, and thus, will be rejected by an IR receiver of the other system (e.g., the television) that is intended to be controlled by remote control signals. However, the interference produced by the TOF camera may be significant enough to prevent a user from being able to actually remotely control the other system (e.g., the television) that is within close proximity to the TOF camera. This can be frustrating to the user, as they may not be able to adjust the volume, brightness, channel, and/or the like, of the other system (e.g., the television) using the remote control device. In other words, a TOF camera can render a remote control device inoperative. Due to relatively poor optical bandpass characteristics of IR receives of televisions, or other systems, such interference problems may even occur where the IR wavelength used by a TOF camera differs from the IR wavelength used by a remote control device. For example, such interference problems may even occur where the wavelength of the IR light used by the TOF camera is about 860 nm and the IR light used by a remote control device is about 940 nm. Further, it is noted that a TOF camera may also cause similar interference problems with other systems that receive and respond to wireless IR signals, such as, but not limited to, systems that include wireless IR headphones and three-dimensional (3D) television systems that include active shutter 3D glasses.

SUMMARY

Certain embodiments disclosed are directed to time-of-flight (TOF) systems, and methods for use therewith, that substantially reduce interference that the TOF system may cause to at least one other system that is configured to wirelessly receive and respond to IR light signals. Some such embodiments involve emitting IR light having a low frequency (LF) power envelope that is shaped to substantially reduce frequency content within at least one frequency range known to be used by at least one other system configured to wirelessly receive and respond to IR light signals, wherein at least a portion of IR light being emitted is radio frequency (RF) modulated IR light, and thus, includes an RF component. Such embodiments can also involve detecting at least a portion of the emitted RF modulated IR light that has reflected off one or more objects. A TOF system can produce depth images in dependence on results of the detecting, as well as update an application in dependence on the depth images. A LF power envelope, as the term is used herein, is the LF average power delivered over time by a signal.

A TOF system can be configured to obtain a separate depth image corresponding to each of a plurality of frame periods, wherein each frame period is followed by an inter-frame period, each frame period includes at least two integration periods, and each integration period is followed by a readout period. IR light can be emitted during each of the integration periods, to enable depth images to be produced. Additionally, to reduce how often there are transitions from times during which IR light is being emitted and times during which IR light is not being emitted, and thereby reduce frequency content associated with the transitions, the IR light can also be emitted during the readout periods between pairs of the integration periods within each frame period.

In certain embodiments, in order to decrease a gain level of an automatic gain control (AGC) circuit for use with an IR light receiver of at least one other system configured to wirelessly receive and respond to IR light signals, and thereby make the IR light receiver of the at least one other system less sensitive to interference from the TOF system, IR light can be emitted during the readout periods between pairs of the integration periods within each frame period, as well as during at least a portion the inter-frame periods between pairs of frames. This can be in addition to the IR light that is emitted during the integration periods.

IR light may be emitted by producing a drive signal including an RF component and having a LF power envelope that is shaped to substantially reduce frequency content within at least one frequency range known to be used by at least one other system configured to wirelessly receive and respond to IR light signals, and driving at least one light source with the drive signal including the RF component.

In an embodiment, the LF power envelope can be shaped by ramping up pulse amplitudes of the drive signal when transitioning from a time during which no light source is driven to emit IR light to a time during which a light source is driven by the drive signal to emit IR light, and ramping down pulse amplitudes of the drive signal when transitioning from a time during which a light source is driven by the drive signal to emit IR light to a time during which no light source is driven to emit IR light.

In an embodiment, the LF power envelope can be shaped by ramping up pulse duty cycles of the drive signal when transitioning from a time during which no light source is driven to emit IR light to a time during which a light source is driven by the drive signal to emit IR light, and ramping down pulse duty cycles of the drive signal when transitioning from a time during which a light source is driven by the drive signal to emit IR light to a time during which no light source is driven to emit IR light.

In an embodiment, the LF power envelope can be shaped by ramping down temporal gaps between pulses or pulse trains of the drive signal when transitioning from a time during which no light source is driven to emit IR light to a time during which a light source is driven by the drive signal to emit IR light, and ramping up temporal gaps between pulses or pulse trains of the drive signal when transitioning from a time during which a light source is driven by the drive signal to emit IR light to a time during which no light source is driven to emit IR light.

In an embodiment, the LF power envelope can be shaped by ramping down how often gaps occur between pulses or pulse trains of the drive signal when transitioning from a time during which no light source is driven to emit IR light to a time during which a light source is driven by the drive signal to emit IR light, and ramping up how often gaps occur between pulses or pulse trains of the drive signal when transitioning from a time during which a light source is driven by the drive signal to emit IR light to a time during which no light source is drive to emit IR light.

Any of the aforementioned ramping up preferably occurs over a time period of at least 50 µsec, and any of the aforementioned ramping down preferably also occurs over a time period of at least 50 µsec. Time permitting, the ramping up and ramping down may occur over longer periods of time.

More generally, embodiments of the present technology can be used to reduce the adverse effects that TOF systems may have on other systems that are configured to wirelessly receive and respond to IR light signals, while preserving correct TOF operation. Such embodiments preferably do not degrade, or minimally degrade, performance of TOF systems. Additionally, such embodiments preferably do not increase, or minimally increase, power usage by TOF system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 1A and 1B illustrate an example embodiment of a tracking system with a user playing a game.

FIG. 6 depicts exemplary data in an exemplary depth image.

FIG. 7 illustrates exemplary timing and amplitude details associated with two exemplary frames of a signal for use with a TOF system.

FIG. 8 illustrates an exemplary LF frequency power spectrum associated with the signal shown in FIG. 7.

FIG. 9 illustrates how the LF power spectrum of drive and IR light signals can be shaped, in accordance with an embodiment, to substantially reduce frequency content within at least one frequency range known to be used by at least one other system configured to wirelessly receive and respond to IR light signals.

FIG. 10 illustrates how the LF power spectrum of drive and IR light signals can be shaped, in accordance with another embodiment, to substantially reduce frequency content within at least one frequency range known to be used by at least one other system configured to wirelessly receive and respond to IR light signals.

DETAILED DESCRIPTION

Certain embodiments of the present technology disclosed herein are directed to TOF systems, and methods for user therewith, that substantially reduce interference that a TOF system may cause to at least one other system (e.g., a television, a set top box, a DVD player, IR headphones and/or active 3D glasses) that is configured to wirelessly receive and respond to IR light signals. Before providing additional details of such embodiments of the present technology, exemplary details of systems with which embodiments of the present technology can be used will first be described.

Figure 1B:
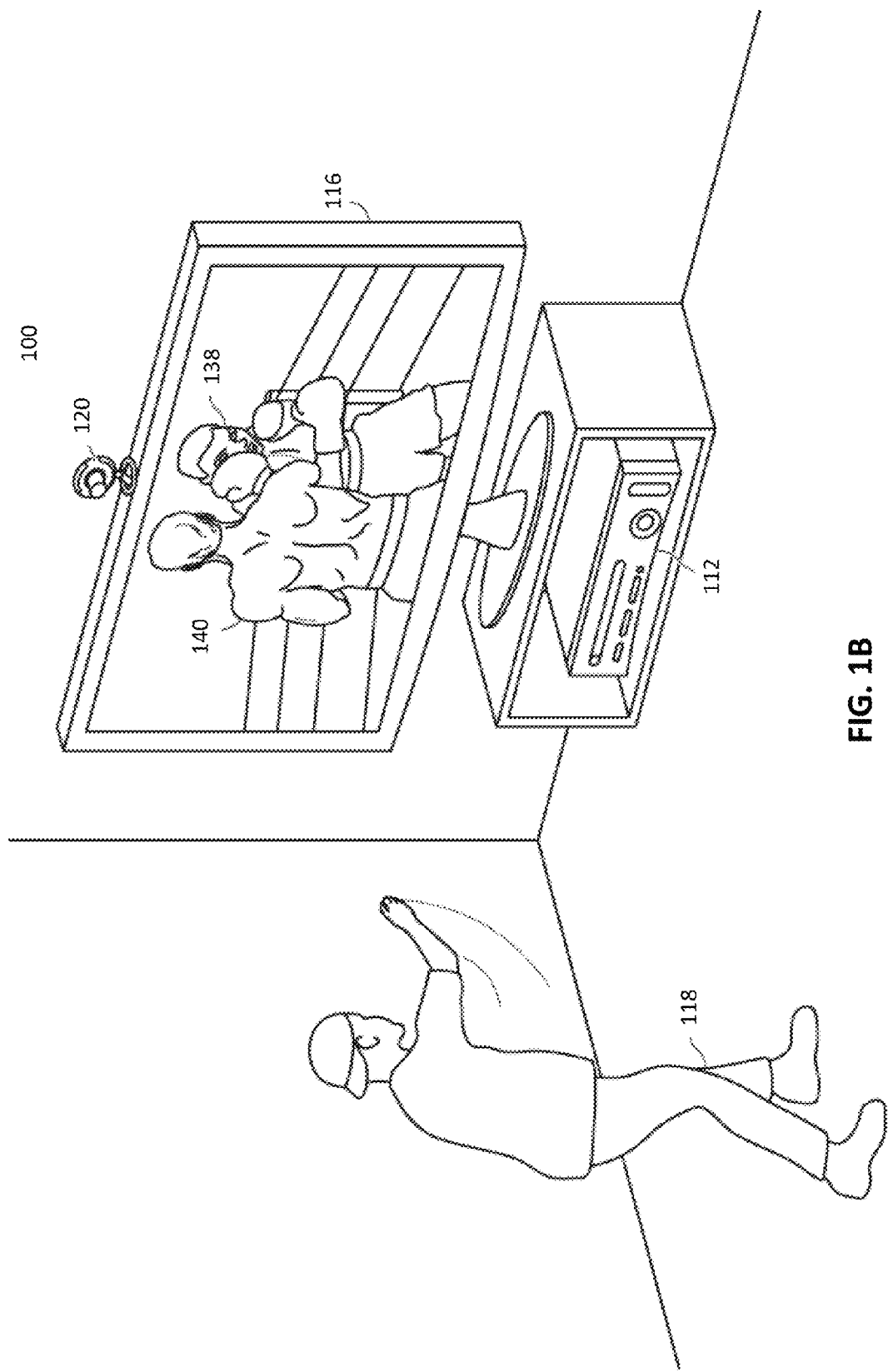

FIGS. 1A and 1B illustrate an example embodiment of a tracking system 100 with a user 118 playing a boxing video game. In an example embodiment, the tracking system 100 may be used to recognize, analyze, and/or track a human target such as the user 118 or other objects within range of the tracking system 100. As shown in FIG. 1A, the tracking system 100 includes a computing system 112 and a capture device 120. As will be describe in additional detail below, the capture device 120 can be used to obtain depth images and color images (also known as RGB images) that can be used by the computing system 112 to identify one or more users or other objects, as well as to track motion and/or other user behaviors. The tracked motion and/or other user behavior can be used to update an application. Therefore, a user can manipulate game characters or other aspects of the application by using movement of the user's body and/or objects around the user, rather than (or in addition to) using controllers, remotes, keyboards, mice, or the like. For example, a video game system can update the position of images displayed in a video game based on the new positions of the objects or update an avatar based on motion of the user.

The computing system 112 may be a computer, a gaming system or console, or the like. According to an example embodiment, the computing system 112 may include hardware components and/or software components such that computing system 112 may be used to execute applications such as gaming applications, non-gaming applications, or the like. In one embodiment, computing system 112 may include a processor such as a standardized processor, a specialized processor, a microprocessor, or the like that may execute instructions stored on a processor readable storage device for performing the processes described herein.

The capture device 120 may include, for example, a camera that may be used to visually monitor one or more users, such as the user 118, such that gestures and/or movements performed by the one or more users may be captured, analyzed, and tracked to perform one or more controls or actions within the application and/or animate an avatar or on-screen character, as will be described in more detail below.

According to one embodiment, the tracking system 100 may be connected to an audiovisual device 116 such as a television, a monitor, a high-definition television (HDTV), or the like that may provide game or application visuals and/or audio to a user such as the user 118. For example, the computing system 112 may include a video adapter such as a graphics card and/or an audio adapter such as a sound card that may provide audiovisual signals associated with the game application, non-game application, or the like. The audiovisual device 116 may receive the audiovisual signals from the computing system 112 and may then output the game or application visuals and/or audio associated with the audiovisual signals to the user 118. According to one embodiment, the audiovisual device 16 may be connected to the computing system 112 via, for example, an S-Video cable, a coaxial cable, an HDMI cable, a DVI cable, a VGA cable, component video cable, or the like.

As shown in FIGS. 1A and 1B, the tracking system 100 may be used to recognize, analyze, and/or track a human target such as the user 118. For example, the user 118 may be tracked using the capture device 120 such that the gestures and/or movements of user 118 may be captured to animate an avatar or on-screen character and/or may be interpreted as controls that may be used to affect the application being executed by computing system 112. Thus, according to one embodiment, the user 118 may move his or her body to control the application and/or animate the avatar or on-screen character.

In the example depicted in FIGS. 1A and 1B, the application executing on the computing system 112 may be a boxing game that the user 118 is playing. For example, the computing system 112 may use the audiovisual device 116 to provide a visual representation of a boxing opponent 138 to the user 118. The computing system 112 may also use the audiovisual device 116 to provide a visual representation of a player avatar 140 that the user 118 may control with his or her movements. For example, as shown in FIG. 1B, the user 118 may throw a punch in physical space to cause the player avatar 140 to throw a punch in game space. Thus, according to an example embodiment, the computer system 112 and the capture device 120 recognize and analyze the punch of the user 118 in physical space such that the punch may be interpreted as a game control of the player avatar 140 in game space and/or the motion of the punch may be used to animate the player avatar 140 in game space.

Other movements by the user 118 may also be interpreted as other controls or actions and/or used to animate the player avatar, such as controls to bob, weave, shuffle, block, jab, or throw a variety of different power punches. Furthermore, some movements may be interpreted as controls that may correspond to actions other than controlling the player avatar 140. For example, in one embodiment, the player may use movements to end, pause, or save a game, select a level, view high scores, communicate with a friend, etc. According to another embodiment, the player may use movements to select the game or other application from a main user interface. Thus, in example embodiments, a full range of motion of the user 118 may be available, used, and analyzed in any suitable manner to interact with an application.

In example embodiments, the human target such as the user 118 may have an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game. Objects not held by the user can also be tracked, such as objects thrown, pushed or rolled by the user (or a different user) as well as self-propelled objects. In addition to boxing, other games can also be implemented.

According to other example embodiments, the tracking system 100 may further be used to interpret target movements as operating system and/or application controls that are outside the realm of games. For example, virtually any controllable aspect of an operating system and/or application may be controlled by movements of the target such as the user 118.

Figure 2A:
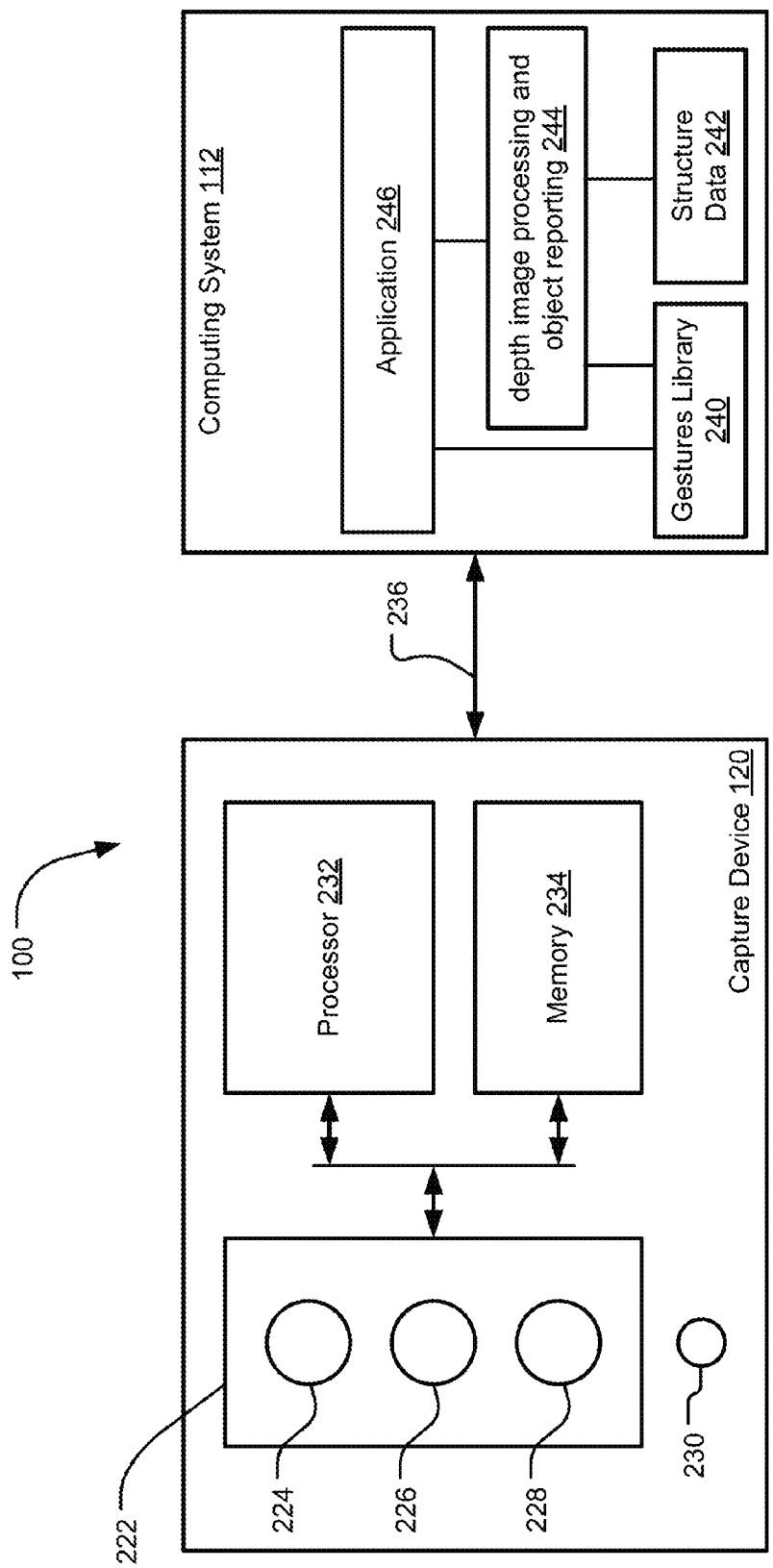
FIG. 2A illustrates an example embodiment of a capture device that may be used as part of the tracking system.

FIG. 2A illustrates an example embodiment of the capture device 120 that may be used in the tracking system 100. According to an example embodiment, the capture device 120 may be configured to capture video with depth information including a depth image that may include depth values via any suitable technique including, for example, time-of-flight, structured light, stereo image, or the like. According to one embodiment, the capture device 120 may organize the depth information into "Z layers," or layers that may be perpendicular to a Z axis extending from the depth camera along its line of sight.

As shown in FIG. 2A, the capture device 120 may include an image camera component 222. According to an example embodiment, the image camera component 222 may be a depth camera that may capture a depth image of a scene. The depth image may include a two-dimensional (2-D) pixel area of the captured scene where each pixel in the 2D pixel area may represent a depth value such as a distance in, for example, centimeters, millimeters, or the like of an object in the captured scene from the camera.

As shown in FIG. 2A, according to an example embodiment, the image camera component 222 may include an infra-red (IR) light component 224, a three-dimensional (3-D) camera 226, and an RGB camera 228 that may be used to capture the depth image of a scene. For example, in time-of-flight (TOF) analysis, the IR light component 224 of the capture device 120 may emit an infrared light onto the scene and may then use sensors (not specifically shown in FIG. 2A) to detect the backscattered light from the surface of one or more targets and objects in the scene using, for example, the 3-D camera 226 and/or the RGB camera 228. In some embodiments, pulsed IR light may be used such that the time between an outgoing light pulse and a corresponding incoming light pulse may be measured and used to determine a physical distance from the capture device 120 to a particular location on the targets or objects in the scene. Additionally or alternatively, the phase of the outgoing light wave may be compared to the phase of the incoming light wave to determine a phase shift. The phase shift may then be used to determine a physical distance from the capture device to a particular location on the targets or objects. Additional details of an exemplary TOF type of 3-D camera 226 are described below with reference to FIG. 2B.

According to another example embodiment, TOF analysis may be used to indirectly determine a physical distance from the capture device 120 to a particular location on the targets or objects by analyzing the intensity of the reflected beam of light over time via various techniques including, for example, shuttered light pulse imaging.

In another example embodiment, the capture device 120 may use a structured light to capture depth information. In such an analysis, patterned light (i.e., light displayed as a known pattern such as grid pattern, a stripe pattern, or different pattern) may be projected onto the scene via, for example, the IR light component 224. Upon striking the surface of one or more targets or objects in the scene, the pattern may become deformed in response. Such a deformation of the pattern may be captured by, for example, the 3-D camera 226 and/or the RGB camera 228 and may then be analyzed to determine a physical distance from the capture device to a particular location on the targets or objects. In some implementations, the IR Light component 224 is displaced from the cameras 226 and 228 so triangulation can be used to determined distance from cameras 226 and 228. In some implementations, the capture device 120 will include a dedicated IR sensor to sense the IR light.

According to another embodiment, the capture device 120 may include two or more physically separated cameras that may view a scene from different angles to obtain visual stereo data that may be resolved to generate depth information. Other types of depth image sensors can also be used to create a depth image.

The capture device 120 may further include a microphone 230. The microphone 230 may include a transducer or sensor that may receive and convert sound into an electrical signal. According to one embodiment, the microphone 230 may be used to reduce feedback between the capture device 120 and the computing system 112 in the target recognition, analysis, and tracking system 100. Additionally, the microphone 230 may be used to receive audio signals (e.g., voice commands) that may also be provided by the user to control applications such as game applications, non-game applications, or the like that may be executed by the computing system 112.

In an example embodiment, the capture device 120 may further include a processor 232 that may be in operative communication with the image camera component 222. The processor 232 may include a standardized processor, a specialized processor, a microprocessor, or the like that may execute instructions including, for example, instructions for receiving a depth image, generating the appropriate data format (e.g., frame) and transmitting the data to computing system 112.

The capture device 120 may further include a memory component 234 that may store the instructions that may be executed by the processor 232, images or frames of images captured by the 3-D camera and/or RGB camera, or any other suitable information, images, or the like. According to an example embodiment, the memory component 234 may include random access memory (RAM), read only memory (ROM), cache, Flash memory, a hard disk, or any other suitable storage component. As shown in FIG. 2A, in one embodiment, the memory component 234 may be a separate component in communication with the image capture component 222 and the processor 232. According to another embodiment, the memory component 234 may be integrated into the processor 232 and/or the image capture component 222.

As shown in FIG. 2A, the capture device 120 may be in communication with the computing system 212 via a communication link 236. The communication link 236 may be a wired connection including, for example, a USB connection, a Firewire connection, an Ethernet cable connection, or the like and/or a wireless connection such as a wireless 802.11b, g, a, or n connection. According to one embodiment, the computing system 112 may provide a clock to the capture device 120 that may be used to determine when to capture, for example, a scene via the communication link 236. Additionally, the capture device 120 provides the depth images and color images captured by, for example, the 3-D camera 226 and/or the RGB camera 228 to the computing system 112 via the communication link 236. In one embodiment, the depth images and color images are transmitted at 30 frames per second. The computing system 112 may then use the model, depth information, and captured images to, for example, control an application such as a game or word processor and/or animate an avatar or on-screen character.

Computing system 112 includes gestures library 240, structure data 242, depth image processing and object reporting module 244 and application 246. Depth image processing and object reporting module 244 uses the depth images to track motion of objects, such as the user and other objects. To assist in the tracking of the objects, depth image processing and object reporting module 244 uses gestures library 240 and structure data 242.

Structure data 242 includes structural information about objects that may be tracked. For example, a skeletal model of a human may be stored to help understand movements of the user and recognize body parts. Structural information about inanimate objects may also be stored to help recognize those objects and help understand movement.

Gestures library 240 may include a collection of gesture filters, each comprising information concerning a gesture that may be performed by the skeletal model (as the user moves). The data captured by the cameras 226, 228 and the capture device 120 in the form of the skeletal model and movements associated with it may be compared to the gesture filters in the gesture library 240 to identify when a user (as represented by the skeletal model) has performed one or more gestures. Those gestures may be associated with various controls of an application. Thus, the computing system 112 may use the gestures library 240 to interpret movements of the skeletal model and to control application 246 based on the movements. As such, gestures library may be used by depth image processing and object reporting module 244 and application 246.

Application 246 can be a video game, productivity application, etc. In one embodiment, depth image processing and object reporting module 244 will report to application 246 an identification of each object detected and the location of the object for each frame. Application 246 will use that information to update the position or movement of an avatar or other images in the display.

Figure 2B:
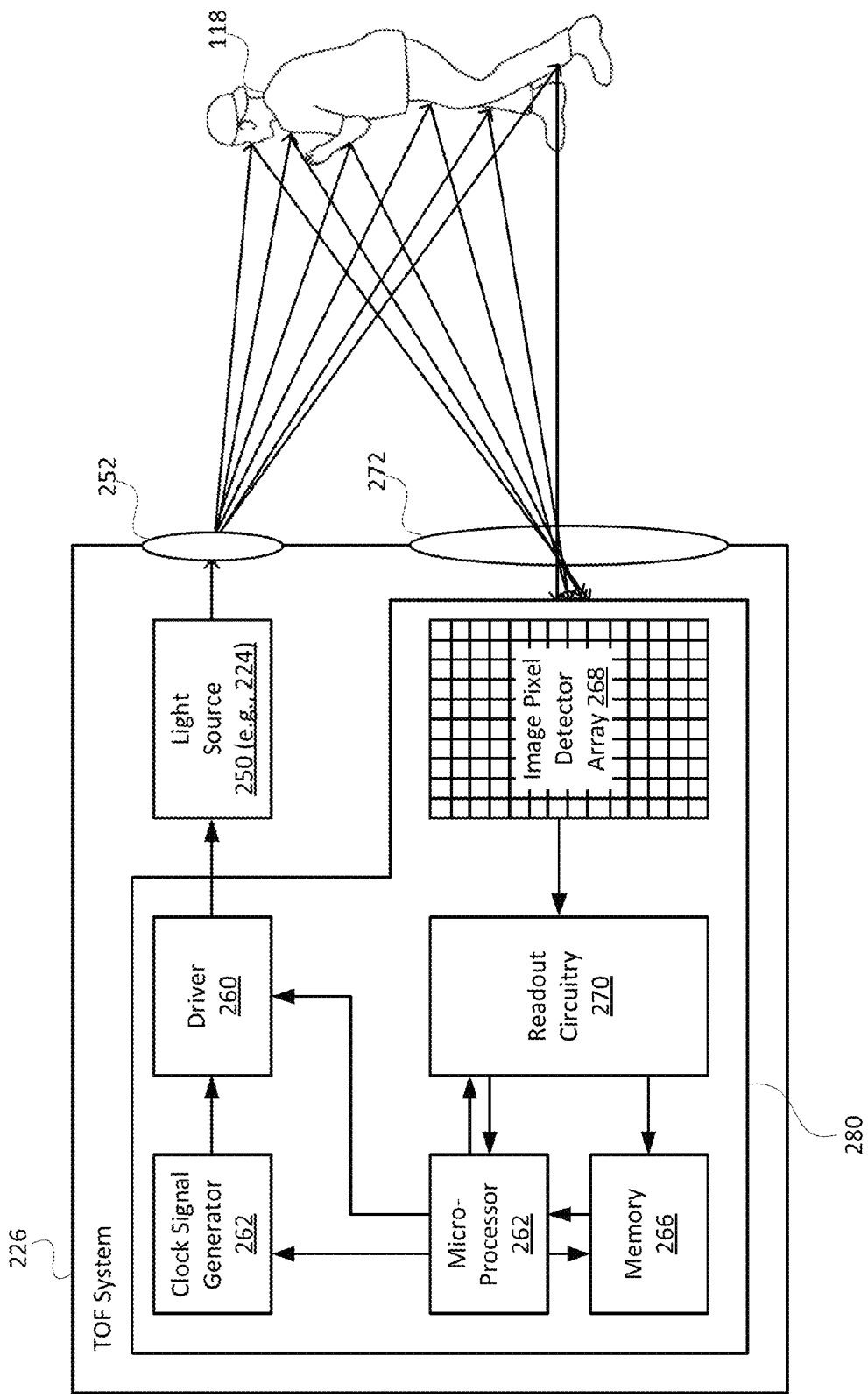
FIG. 2B illustrates an exemplary embodiment of a TOF camera that may be part of the capture device of FIG. 2A.

FIG. 2B illustrates an example embodiment of a TOF type of 3-D camera 226, which can also be referred to as a TOF camera 226, or more generally can be referred to as a TOF system 226. The TOF system 226 is shown as including a driver 260 that drives a light source 250. The light source 250 can be the IR light component 224 shown in FIG. 2A, or can be one or more other light emitting element. More generally, the light source 250 can include one or more light emitting elements, such as, but not limited to, laser diodes or light emitting diodes (LEDs). A laser diode can include one or more vertical-cavity surface-emitting lasers (VCESLs) or edge emitting lasers, but is not limited thereto. It is also possible that there are multiple types of light sources, e.g., a first light source including one or more laser diodes, and a second light source including one or more LEDs. While it is likely that such light emitting elements emit IR light, light of alternative wavelengths can alternatively be emitted by the light emitting elements. Unless stated otherwise, it is assumed that the light source 250 emits IR light.

The TOF system 226 is also shown as including a clock signal generator 262, which produces a clock signal that is provided to the driver 260. Additionally, the TOF system 226 is shown as including a microprocessor 264 that can control the clock signal generator 262 and/or the driver 260. The TOF system 226 is also shown as including an image pixel detector array 268, readout circuitry 270 and memory 266. The image pixel detector array 268 might include, e.g., 320×240 image pixel detectors, but is not limited thereto. Each image pixel detector can be, e.g., a complementary metal-oxide-semiconductor (CMOS) sensor or a charged coupled device (CCD) sensor, but is not limited thereto. Depending upon implementation, each image pixel detector can have its own dedicated readout circuit, or readout circuitry can be shared by many image pixel detectors. In accordance with certain embodiments, the components of the TOF system 226 shown within the block 280 are implemented in a single integrated circuit (IC), which can also be referred to as a single TOF chip.

The driver 260 can produce a radio frequency (RF) modulated drive signal in dependence on a clock signal received from clock signal generator 262. Accordingly, the driver 260 can include, for example, one or more buffers, amplifiers and/or modulators, but is not limited thereto. The clock signal generator 262 can include, for example, one or more reference clocks and/or voltage controlled oscillators, but is not limited thereto. The microprocessor 264, which can be part of a microcontroller unit, can be used to control the clock signal generator 262 and/or the driver 260. For example, the microprocessor 264 can access waveform information stored in the memory 266 in order to produce an RF modulated drive signal in accordance with various embodiments described herein. The TOF system 226 can includes its own memory 266 and microprocessor 264, as shown in FIG. 2B. Alternatively, or additionally, the processor 232 and/or memory 234 of the capture device 120 can be used to control aspects of the TOF system 226.

In response to being driven by an RF modulated drive signal, the light source 250 emits RF modulated light, which can also be referred to as an RF modulate light signal. For an example, a carrier frequency of the RF modulated drive signal and the RF modulated light can be in a range from about 5 MHz to many hundreds of MHz, but for illustrative purposes will be assumed to be about 100 MHz. The light emitted by the light source 250 is transmitted through an optional lens or light shaping diffuser 252 towards a target object (e.g., a user 118). Assuming that there is a target object within the field of view of the TOF camera, a portion of the RF modulated emitted light reflects off the target object, passes through an aperture field stop and lens (collectively 272), and is incident on the image pixel detector array 268 where an image is formed. In some implementations, each individual image pixel detector of the array 268 produces an integration value indicative of a magnitude and a phase of detected RF modulated light originating from the light source that has reflected off the object and is incident of the image pixel detector. Such integrations values, or more generally TOF information, enable distances (Z) to be determined, and collectively, enable depth images to be produced. In certain embodiments, optical energy from the light source 250 and detected optical energy signals are synchronized to each other such that a phase difference, and thus a distance Z, can be measured from each image pixel detector. The readout circuitry 270 converts analog integration values generated by the image pixel detector array 268 into digital readout signals, which are provided to the microprocessor 264 and/or the memory 266, and which can be used to produce depth images.

Figure 3:
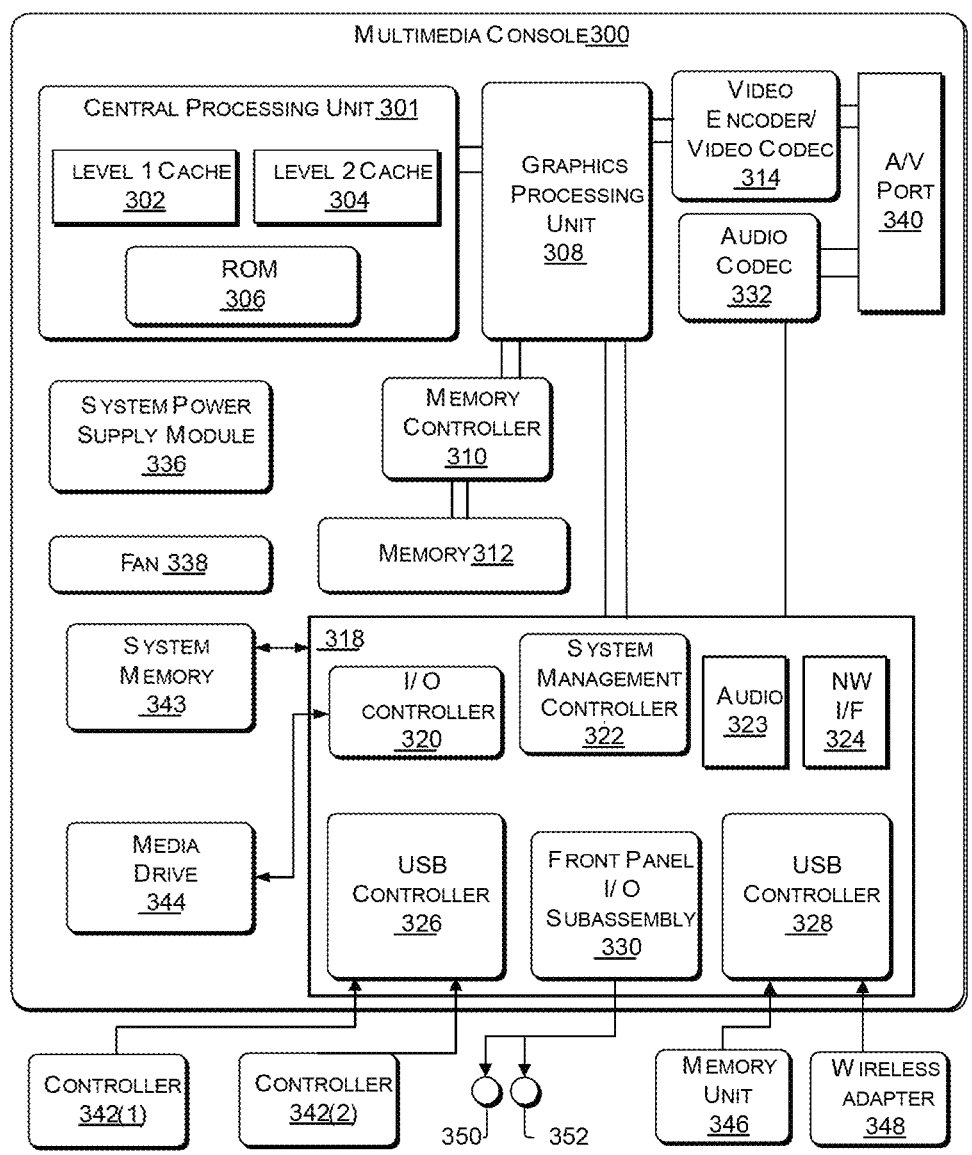
FIG. 3 illustrates an example embodiment of a computing system that may be used to track user behavior and update an application based on the user behavior.

FIG. 3 illustrates an example embodiment of a computing system that may be the computing system 112 shown in FIGS. 1A-2B used to track motion and/or animate (or otherwise update) an avatar or other on-screen object displayed by an application. The computing system such as the computing system 112 described above with respect to FIGS. 1A-2 may be a multimedia console, such as a gaming console. As shown in FIG. 3, the multimedia console 300 has a central processing unit (CPU) 301 having a level 1 cache 102, a level 2 cache 304, and a flash ROM (Read Only Memory) 306. The level 1 cache 302 and a level 2 cache 304 temporarily store data and hence reduce the number of memory access cycles, thereby improving processing speed and throughput. The CPU 301 may be provided having more than one core, and thus, additional level 1 and level 2 caches 302 and 304. The flash ROM 306 may store executable code that is loaded during an initial phase of a boot process when the multimedia console 300 is powered ON.

A graphics processing unit (GPU) 308 and a video encoder/video codec (coder/decoder) 314 form a video processing pipeline for high speed and high resolution graphics processing. Data is carried from the graphics processing unit 308 to the video encoder/video codec 314 via a bus. The video processing pipeline outputs data to an A/V (audio/video) port 340 for transmission to a television or other display. A memory controller 310 is connected to the GPU 308 to facilitate processor access to various types of memory 312, such as, but not limited to, a RAM (Random Access Memory).

The multimedia console 300 includes an I/O controller 320, a system management controller 322, an audio processing unit 323, a network interface 324, a first USB host controller 326, a second USB controller 328 and a front panel I/O subassembly 330 that are preferably implemented on a module 318. The USB controllers 326 and 328 serve as hosts for peripheral controllers 342(1)-342(2), a wireless adapter 348, and an external memory device 346 (e.g., flash memory, external CD/DVD ROM drive, removable media, etc.). The network interface 324 and/or wireless adapter 348 provide access to a network (e.g., the Internet, home network, etc.) and may be any of a wide variety of various wired or wireless adapter components including an Ethernet card, a modem, a Bluetooth module, a cable modem, and the like.

System memory 343 is provided to store application data that is loaded during the boot process. A media drive 344 is provided and may comprise a DVD/CD drive, Blu-Ray drive, hard disk drive, or other removable media drive, etc. The media drive 344 may be internal or external to the multimedia console 300. Application data may be accessed via the media drive 344 for execution, playback, etc. by the multimedia console 300. The media drive 344 is connected to the I/O controller 320 via a bus, such as a Serial ATA bus or other high speed connection (e.g., IEEE 1394).

The system management controller 322 provides a variety of service functions related to assuring availability of the multimedia console 300. The audio processing unit 323 and an audio codec 332 form a corresponding audio processing pipeline with high fidelity and stereo processing. Audio data is carried between the audio processing unit 323 and the audio codec 332 via a communication link. The audio processing pipeline outputs data to the A/V port 340 for reproduction by an external audio player or device having audio capabilities.

The front panel I/O subassembly 330 supports the functionality of the power button 350 and the eject button 352, as well as any LEDs (light emitting diodes) or other indicators exposed on the outer surface of the multimedia console 300. A system power supply module 336 provides power to the components of the multimedia console 300. A fan 338 cools the circuitry within the multimedia console 300.

The CPU 301, GPU 308, memory controller 310, and various other components within the multimedia console 300 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 300 is powered ON, application data may be loaded from the system memory 343 into memory 312 and/or caches 302, 304 and executed on the CPU 301. The application may present a graphical user interface that provides a consistent user experience when navigating to different media types available on the multimedia console 300. In operation, applications and/or other media contained within the media drive 344 may be launched or played from the media drive 344 to provide additional functionalities to the multimedia console 300.

The multimedia console 300 may be operated as a standalone system by simply connecting the system to a television or other display. In this standalone mode, the multimedia console 300 allows one or more users to interact with the system, watch movies, or listen to music. However, with the integration of broadband connectivity made available through the network interface 324 or the wireless adapter 348, the multimedia console 300 may further be operated as a participant in a larger network community.

When the multimedia console 300 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 Kbps), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 300 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 301 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 342(1) and 342(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 226, 228 and capture device 120 may define additional input devices for the console 300 via USB controller 326 or other interface.

Figure 4:
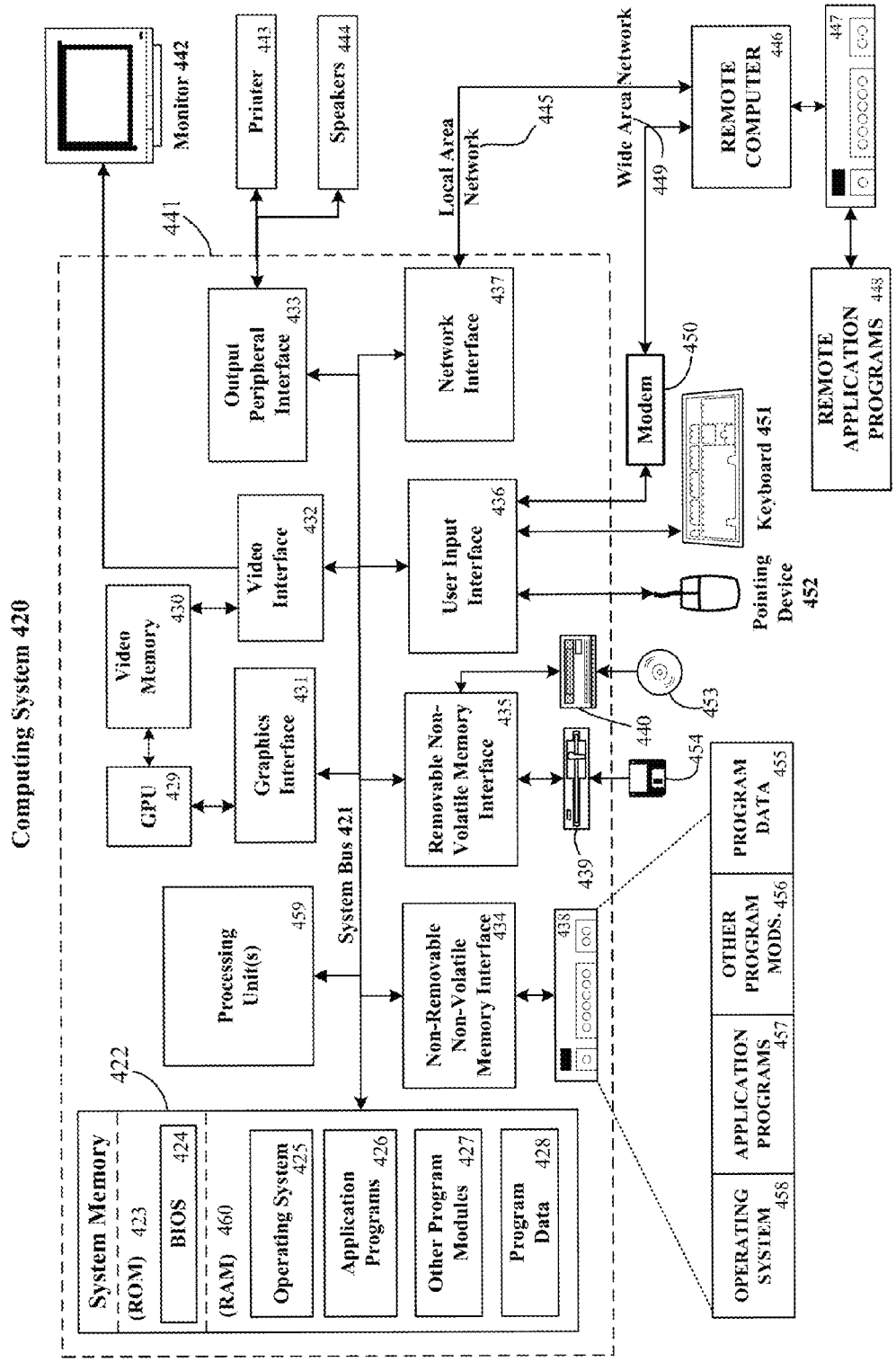
FIG. 4 illustrates another example embodiment of a computing system that may be used to track user behavior and update an application based on the tracked user behavior.

FIG. 4 illustrates another example embodiment of a computing system 420 that may be the computing system 112 shown in FIGS. 1A-2B used to track motion and/or animate (or otherwise update) an avatar or other on-screen object displayed by an application. The computing system 420 is only one example of a suitable computing system and is not intended to suggest any limitation as to the scope of use or functionality of the presently disclosed subject matter. Neither should the computing system 420 be interpreted as having any dependency or requirement relating to any one or combination of components illustrated in the exemplary computing system 420. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computing system 420 comprises a computer 441, which typically includes a variety of computer readable media. Computer readable media can be any available media that can be accessed by computer 441 and includes both volatile and nonvolatile media, removable and non-removable media. The system memory 422 includes computer storage media in the form of volatile and/or nonvolatile memory such as read only memory (ROM) 423 and random access memory (RAM) 460. A basic input/output system 424 (BIOS), containing the basic routines that help to transfer information between elements within computer 441, such as during start-up, is typically stored in ROM 423. RAM 460 typically contains data and/or program modules that are immediately accessible to and/or presently being operated on by processing unit 459. By way of example, and not limitation, FIG. 4 illustrates operating system 425, application programs 426, other program modules 427, and program data 428.

The computer 441 may also include other removable/non-removable, volatile/nonvolatile computer storage media. By way of example only, FIG. 4 illustrates a hard disk drive 438 that reads from or writes to non-removable, nonvolatile magnetic media, a magnetic disk drive 439 that reads from or writes to a removable, nonvolatile magnetic disk 454, and an optical disk drive 440 that reads from or writes to a removable, nonvolatile optical disk 453 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 438 is typically connected to the system bus 421 through an non-removable memory interface such as interface 434, and magnetic disk drive 439 and optical disk drive 440 are typically connected to the system bus 421 by a removable memory interface, such as interface 435.

The drives and their associated computer storage media discussed above and illustrated in FIG. 4, provide storage of computer readable instructions, data structures, program modules and other data for the computer 441. In FIG. 4, for example, hard disk drive 438 is illustrated as storing operating system 458, application programs 457, other program modules 456, and program data 455. Note that these components can either be the same as or different from operating system 425, application programs 426, other program modules 427, and program data 428. Operating system 458, application programs 457, other program modules 456, and program data 455 are given different numbers here to illustrate that, at a minimum, they are different copies. A user may enter commands and information into the computer 441 through input devices such as a keyboard 451 and pointing device 452, commonly referred to as a mouse, trackball or touch pad. Other input devices (not shown) may include a microphone, joystick, game pad, satellite dish, scanner, or the like. These and other input devices are often connected to the processing unit 459 through a user input interface 436 that is coupled to the system bus, but may be connected by other interface and bus structures, such as a parallel port, game port or a universal serial bus (USB). The cameras 226, 228 and capture device 120 may define additional input devices for the computing system 420 that connect via user input interface 436. A monitor 442 or other type of display device is also connected to the system bus 421 via an interface, such as a video interface 432. In addition to the monitor, computers may also include other peripheral output devices such as speakers 444 and printer 443, which may be connected through a output peripheral interface 433. Capture Device 120 may connect to computing system 420 via output peripheral interface 433, network interface 437, or other interface.

The computer 441 may operate in a networked environment using logical connections to one or more remote computers, such as a remote computer 446. The remote computer 446 may be a personal computer, a server, a router, a network PC, a peer device or other common network node, and typically includes many or all of the elements described above relative to the computer 441, although only a memory storage device 447 has been illustrated in FIG. 4. The logical connections depicted include a local area network (LAN) 445 and a wide area network (WAN) 449, but may also include other networks. Such networking environments are commonplace in offices, enterprise-wide computer networks, intranets and the Internet.

When used in a LAN networking environment, the computer 441 is connected to the LAN 445 through a network interface 437. When used in a WAN networking environment, the computer 441 typically includes a modem 450 or other means for establishing communications over the WAN 449, such as the Internet. The modem 450, which may be internal or external, may be connected to the system bus 421 via the user input interface 436, or other appropriate mechanism. In a networked environment, program modules depicted relative to the computer 441, or portions thereof, may be stored in the remote memory storage device. By way of example, and not limitation, FIG. 4 illustrates application programs 448 as residing on memory device 447. It will be appreciated that the network connections shown are exemplary and other means of establishing a communications link between the computers may be used.

As explained above, the capture device 120 provides RGB images (also known as color images) and depth images to the computing system 112. The depth image may be a plurality of observed pixels where each observed pixel has an observed depth value. For example, the depth image may include a two-dimensional (2-D) pixel area of the captured scene where each pixel in the 2-D pixel area may have a depth value such as a length or distance in, for example, centimeters, millimeters, or the like of an object in the captured scene from the capture device.

Figure 5:
FIG. 5 illustrates an exemplary depth image.

FIG. 5 illustrates an example embodiment of a depth image that may be received at computing system 112 from capture device 120. According to an example embodiment, the depth image may be an image and/or frame of a scene captured by, for example, the 3-D camera 226 and/or the RGB camera 228 of the capture device 120 described above with respect to FIG. 2A. As shown in FIG. 5, the depth image may include a human target corresponding to, for example, a user such as the user 118 described above with respect to FIGS. 1A and 1B and one or more non-human targets such as a wall, a table, a monitor, or the like in the captured scene. The depth image may include a plurality of observed pixels where each observed pixel has an observed depth value associated therewith. For example, the depth image may include a two-dimensional (2-D) pixel area of the captured scene where each pixel at particular x-value and y-value in the 2-D pixel area may have a depth value such as a length or distance in, for example, centimeters, millimeters, or the like of a target or object in the captured scene from the capture device. In other words, a depth image can specify, for each of the pixels in the depth image, a pixel location and a pixel depth. Following a segmentation process, each pixel in the depth image can also have a segmentation value associated with it. The pixel location can be indicated by an x-position value (i.e., a horizontal value) and a y-position value (i.e., a vertical value). The pixel depth can be indicated by a z-position value (also referred to as a depth value), which is indicative of a distance between the capture device (e.g., 120) used to obtain the depth image and the portion of the user represented by the pixel. The segmentation value is used to indicate whether a pixel corresponds to a specific user, or does not correspond to a user.

In one embodiment, the depth image may be colorized or grayscale such that different colors or shades of the pixels of the depth image correspond to and/or visually depict different distances of the targets from the capture device 120. Upon receiving the image, one or more high-variance and/or noisy depth values may be removed and/or smoothed from the depth image; portions of missing and/or removed depth information may be filled in and/or reconstructed; and/or any other suitable processing may be performed on the received depth image.

Figure 6:
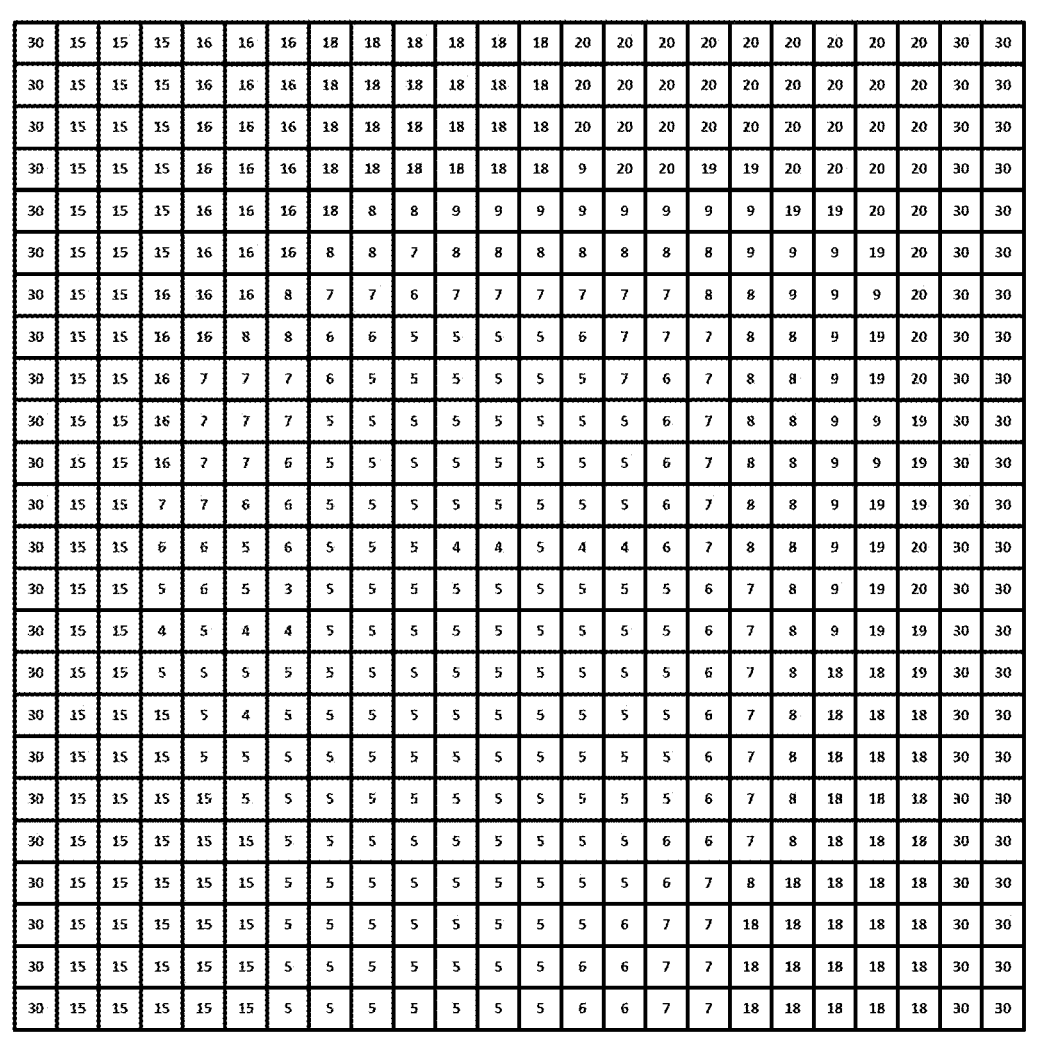

FIG. 6 provides another view/representation of a depth image (not corresponding to the same example as FIG. 5). The view of FIG. 6 shows the depth data for each pixel as an integer that represents the distance of the target to capture device 120 for that pixel. The example depth image of FIG. 6 shows 24×24 pixels; however, it is likely that a depth image of greater resolution would be used.

Techniques for Reducing IR Remote Control Interference Caused by TOF Systems

As mentioned above, a TOF system (e.g., 226) may be located in close proximity to (e.g., within the same room as) a consumer electronic device (e.g., a television, a set top box and/or a media player) that is/are configured to be remotely controlled by a handheld remote control device. For example, referring back to FIGS. 1A and 2A, the capture device 120 can include a TOF system 226 that is located close to the television or display 116. Additionally, or alternatively, a TOF system may be located in close proximity to other types of systems configured to wirelessly receive and respond to IR light signals, such as, but not limited to, systems that include wireless IR headphones and 3D television systems that include active shutter 3D glasses.

As also explained above, the TOF system may operate by illuminating a target (e.g., user 118) with RF modulated IR light and detecting IR light that reflects off the target and is incident on an image pixel detector array of the TOF camera. While the carrier frequency of the RF modulated IR light is typically well above the carrier frequency of remote control signals, abrupt transitions from times during which the light source does not emit the RF modulated light to times during which the light source emits RF modulated light, and vice versa, can produce lower frequency content that can interfere with the remote control signals. Explained another way, a low frequency content associated with the modulated IR light, produced by the TOF system, may interfere with remote control signals intended to control another device (e.g., a television) within the vicinity of the TOF system. While most if not all of the interference produced by the TOF system will not correspond to a valid remote control command (and thus, will be rejected by a remote control receiver of the other device as an invalid command), the interference produced by the TOF system may be significant enough to prevent a user from being able to actually remotely control the other device (e.g., the television or display 116) that is within close proximity to the TOF system. The low frequency content produced by the TOF system can similarly interference with other types of systems that are configured to wirelessly receive and respond to IR light signals. Certain embodiments of the present technology described below, which are for use with a TOF system, substantially reduce frequency content within the range of frequencies known to be used by remote control devices and/or within one or more other frequency ranges known to be used by other systems configured to wirelessly receive and respond to IR light signals. Accordingly, such embodiments enable other systems to operate in their intended manner when in close proximity to a TOF system. For a more specific example, such embodiments enable consumer electronic devices to be remotely controlled even though they are in close proximity to a TOF system.

Most, IR remote control signals have a carrier frequency between 10 kHz and 100 kHz, and even more specifically between 30 kHz and 60 kHz. Certain remote control devices, for example, transmit IR remote control signals having a carrier frequency of about 36 kHz (this is not to be confused with the actual frequency of the IR light itself). There are also some systems that utilize IR remote control signals having a carrier frequency of about 455 KHz. Still other systems utilize IR remote control signals having a carrier frequency of about 1 MHz. A consumer electronic device (e.g., television, set top box or media player) that is controllable by remote control signals includes a remote control receiver that is configured to receive and decode remote control signals within an expected frequency range, examples of which were discussed above.

Before describing various embodiments of the present technology, FIG. 7 will first be used to describe a typical RF modulated drive signal generated by a TOF system and a typical RF modulated IR light signal emitted by the TOF system. More specifically, FIG. 7 illustrates exemplary pulse timing and pulse amplitude details associated with two exemplary frames of signals for use with a TOF system. The frames shown in FIG. 7 can be for use with a TOF system that, for example, is configured to obtain a separate depth image corresponding to each of a plurality of frames, which can also be referred to as frame periods. The waveforms shown in FIG. 7 are illustrative of both an RF modulated drive signal used to drive an IR light source, as well as an RF modulated IR light signal produced by (and more specifically, emitted by) the light source being driven by the RF modulated drive signal.

As shown in FIG. 7, each frame period is followed by an inter-frame period, which separates the frame period from the next frame period. Depending upon implementation, the length of each frame period may or may not be the same as the length of each inter-frame period. Each frame period includes at least two integration periods, and each integration period is followed by a readout period. For a more specific example, a frame period may include ten integration periods, each of which is followed by a respective one of ten readout periods. Except for the last readout period of a frame period, each of the readout periods separates a pair of the integration periods of the frame period. The frame rate can be, for example, 30 Hz, but is not limited thereto. Where the frame rate is 30 Hz, each frame period plus inter-frame period pair is about 33.33 msec.

Still referring to FIG. 7, each of the integration periods is shown as including numerous pulses having the same pulse amplitude, and each of the readout periods and inter-frame periods is shown as including no pulses. As mentioned above, FIG. 7 is illustrative of an RF modulated drive signal, as well as the RF modulated IR light signal generated by driving an IR light source with the RF modulated drive signal. Assuming that the pulse frequency is about 100 MHz, the pulse frequency is well above the frequency range known to be used by most other systems that are configured to wirelessly receive and respond to IR light signals. Nevertheless, the LF power envelope of the RF modulated IR light includes significant frequency content within the frequency ranges known to be used by other systems that are configured to wirelessly receive and respond to IR light signal, examples of which were discussed above. Such frequency content is primarily due to the abrupt transitions from times during which the light source is not driven by the RF modulated drive signal to times during which the light source is driven by the RF modulated drive signal, and vice versa, which occur at the beginning and end of each of the integration periods. The shaded areas labeled 702 in FIG. 7 are illustrative of the LF power envelopes of the RF modulated drive signal and the RF modulated light signal produced using the drive signal. A LF power envelope, as the term is used herein, is the LF average power delivered over time by a signal.

FIG. 8 illustrates an exemplary LF frequency power spectrum associated with the signal shown in FIG. 7. As can be appreciated from FIG. 8, there is significant frequency content within the 10 kHz to 100 kHz frequency range known to be used by remote control devices. It is this spectral energy produced by a TOF system that results, for example, in interference that may prevent a system (e.g., a television or display) within close proximity to the TOF system from being remotely controlled using IR remote control signals. Although not shown in FIG. 8, since FIG. 8 only shows LF content, the power spectrum associated with the signal shown in FIG. 7 will also include a peak at the carrier frequency, e.g., at 100 MHz.

Certain embodiments of the present technology, which are described below, smooth out the edges of the LF power envelopes of the drive and IR light signals. This has the effect of substantially reducing frequency content within the frequency ranges known to be used by remote controlled devices and other systems configured to wirelessly receive and respond to IR light signals.

A first embodiment for smoothing out the edges of the LF power envelopes, which is illustrated in FIG. 9, involves ramping up the pulse amplitudes of an RF component of a drive signal when transitioning from a time during which no light source is driven to emit IR light to a time during which a light source is driven by the drive signal to emit IR light. This embodiment also includes ramping down pulse amplitudes of the RF component of the drive signal when transitioning from a time during which a light source is driven by the drive signal to emit IR light to a time during which no light source is driven to emit IR light. By driving the light source with the drive signal having pulse amplitudes that ramp up and thereafter ramp down, the RF component of the IR light signal emitted by the light source will also have pulse amplitudes that ramp up and thereafter ramp down. The shaded areas labeled 902 in FIG. 9 are illustrative of the LF power envelopes of the drive signal and the IR light signal produced using the drive signal. The ramping up of the pulse amplitudes should occur over a period of at least 50 μsec and the ramping down of the pulse amplitudes should occur over a period of at least 50 μsec. Time permitting, the ramping up of the pulse amplitudes preferably occurs over a period between approximately 1 msec and 10 msec, and the ramping down similarly preferably occurs over a period between approximately 1 msec and 10 msec, which should ensure a substantial reduction in frequency content between 10 kHz and 100 kHz, which is the frequency range typically used to transmit IR remote control signals. It is noted that FIG. 9 is included for illustrative purposes, but is not drawn to scale, since the ramping up and down of pulse amplitudes will occur over much more than three or four pulses.

There are various different ways to implement the embodiment described with reference to FIG. 9. For example, referring back to FIG. 2B, the microprocessor 264 can control the clock signal generator 262 to produce clock pulses having pulse amplitudes that ramp up and ramp down. Alternatively, the microprocessor 264 can control the driver 260 to produce an RF modulated drive signal that includes pulse amplitudes that ramp up and ramp down. For example, the driver 260 can include a pulse amplitude modulator that is controlled by the microprocessor 264. The microprocessor 264 may access information regarding pulse amplitudes from the memory 266. Such a pulse amplitude modulator can be implemented, e.g., using an amplifier having an adjustable gain that is controlled by the microcontroller. These are just a few examples, which are not meant to be all encompassing.

A second embodiment for smoothing out the edges of the LF power envelopes, which is illustrated in FIG. 10, involves ramping up the pulse duty cycles of an RF component of the drive signal when transitioning from a time during which no light source is driven to emit IR light to a time during which a light source is driven by the drive signal to emit IR light. This embodiment also includes ramping down pulse duty cycles of the RF component of the drive signal when transitioning from a time during which the light source is driven by the drive signal to emit IR light to a time during which no light source is driven to emit IR light. By driving the light source with the drive signal having pulse duty cycles that ramp up and thereafter ramp down, the RF component of the light signal emitted by the light source will also have pulse duty cycles that ramp up and thereafter ramp down. The shaded areas labeled 1002 in FIG. 10 are illustrative of the LF power envelopes of the drive signal and the IR light signal produced using the drive signal. The ramping up of the pulse duty cycles should occur over a period of at least 50 μsec and the ramping down of the pulse duty cycles should occur over a period of at least 50 μsec. Time permitting, the ramping up of the pulse duty cycles preferably occurs over a period between approximately 1 msec and 10 msec, and the ramping down similarly occurs over a period between approximately 1 msec and 10 msec, which should ensure a substantial reduction in frequency content between 10 kHz and 100 kHz, which is the frequency range typically used to transmit IR remote control signals. It is noted that FIG. 10 is included for illustrative purposes, but is not drawn to scale, since the ramping up and down of pulse duty cycles will occur over much more than three or four pulses.

There are various different ways to implement the embodiment described with reference to FIG. 10. For example, referring back to FIG. 2B, the microprocessor 264 can control the clock signal generator 262 to produce clock pulses having pulse duty cycles that ramp up and ramp down. Alternatively, the microprocessor 264 can control the driver 260 to produce a drive signal having an RF component that includes pulse duty cycles that ramp up and ramp down. For example, the driver 260 can include a pulse duty cycle modulator that is controlled by the microprocessor 264. The microprocessor 264 may access information regarding pulse duty cycles from the memory 266. Such a pulse duty cycle modulator can be implemented, e.g., using a pulse width modulator. These are just a few examples, which are not meant to be all encompassing.

Figure 11:
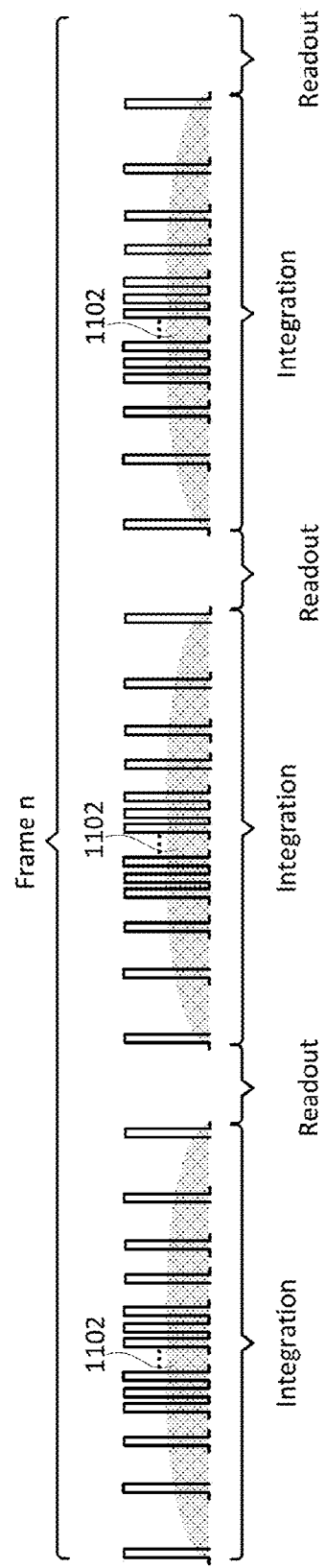
FIG. 11 illustrates how the LF power spectrum of drive and IR light signals can be shaped, in accordance with still another embodiment, to substantially reduce frequency content within at least one frequency range known to be used by at least one other system configured to wirelessly receive and respond to IR light signals.

Another embodiment for smoothing out the edges of the LF power envelopes, which is illustrated in FIG. 11, involves ramping down temporal gaps between adjacent pulses or pulse trains of the RF modulated drive signal when transitioning from a time during which no light source is driven to emit IR light to a time during which a light source is driven by the drive signal to emit IR light. This embodiment also includes ramping up temporal gaps between adjacent pulses or pulse trains of the RF component of the drive signal when transitioning from a time during which a light source is driven by the drive signal to emit IR light to a time during which no light source is driven to emit IR light. By driving the light source with the drive signal including an RF component having temporal gaps between adjacent pulses or pulse trains that ramp down and thereafter ramp up, the RF component of the IR light signal emitted by the light source will also have pulses or pulse trains with temporal gaps that ramp down and thereafter ramp up. The shaded areas labeled 1102 in FIG. 11 are illustrative of the LF power envelopes of the drive signal and the light signal produced using the drive signal. The ramping down of the temporal gaps between adjacent pulses or pulse trains should occur over a period of at least 50 μsec and the ramping down of the temporal gaps between adjacent pulses or pulse trains should occur over a period of at least 50 μsec. Time permitting, the ramping down of the temporal gaps between adjacent pulses or pulse trains preferably occurs over a period between approximately 1 msec and 10 msec, and the ramping up of the temporal gaps between adjacent pulses or pulse trains similarly preferably occurs over a period between approximately 1 msec and 10 msec, which should ensure a substantial reduction in frequency content between 10 kHz and 100 kHz, which is the frequency range typically used to transmit IR remote control signals. It is noted that FIG. 11 is included for illustrative purposes, but is not drawn to scale, since the ramping down and up of temporal gaps between adjacent pulses will occur over much more than three or four pulses. Alternatively, or additionally, there can be a ramping down of how often gaps occur between pulses or pulse trains of a drive signal when transitioning from a time during which no light source is driven to emit IR light to a time during which a light source is driven by the drive signal to emit IR light; and there can be a ramping up of how often gaps occur between pulses or pulse trains of the drive signal when transitioning from a time during which a light source is driven by the drive signal to emit IR light to a time during which no light source is drive to emit IR light.

There are various different ways to implement the embodiment described with reference to FIG. 11. For example, referring back to FIG. 2B, the microprocessor 264 can control the clock signal generator 262 to produce clock pulses having temporal gaps between pulses that that ramp down and ramp up. This can be accomplished, e.g., by not outputting certain clock pulses. Alternatively, a gating circuit can be located between the clock signal generator 262 and the driver 260, so that some clock pulses are not provided to the driver 260, to thereby control the temporal gaps between adjacent pulses or pulse trains, and/or how often gaps occur. In still another embodiment, the gating circuit can be part of or upstream from the driver 260 and can selectively prevent some drive pulses from being provided to the light source 250, to thereby control the temporal gaps between adjacent pulses or pulse trains output by the light source and/or how often gaps occur. The microprocessor 264 can control the clock signal generator 262, the driver 260 and/or such a gating circuit to achieve the ramping up and down of temporal gaps between pulses or pulse trains, and/or how often gaps occur. The microprocessor 264 may access information regarding temporal gaps and/or how often gaps should occur between pulses or pulse trains from the memory 266. These are just a few examples, which are not meant to be all encompassing.

As mentioned above, the abrupt transitions from times during which a light source emits IR light to times during which no light source emits IR light, and vice versa, produces frequency content that can interfere with the IR remote control signals and/or other IR signals used by other systems. As also mentioned above, explained another way, the LF power envelopes associated with the IR light, produced by the TOF camera, may interfere with one or more other system (configured to wirelessly receive and respond to IR light signals) that is/are within close proximity to the TOF camera. An embodiment, which will now be described with reference to FIG. 12, reduces how often there are transitions from times during which IR light is emitted to times during which IR light is not emitted, and vice versa, thereby reducing frequency content associated with such transitions.

Figure 12:
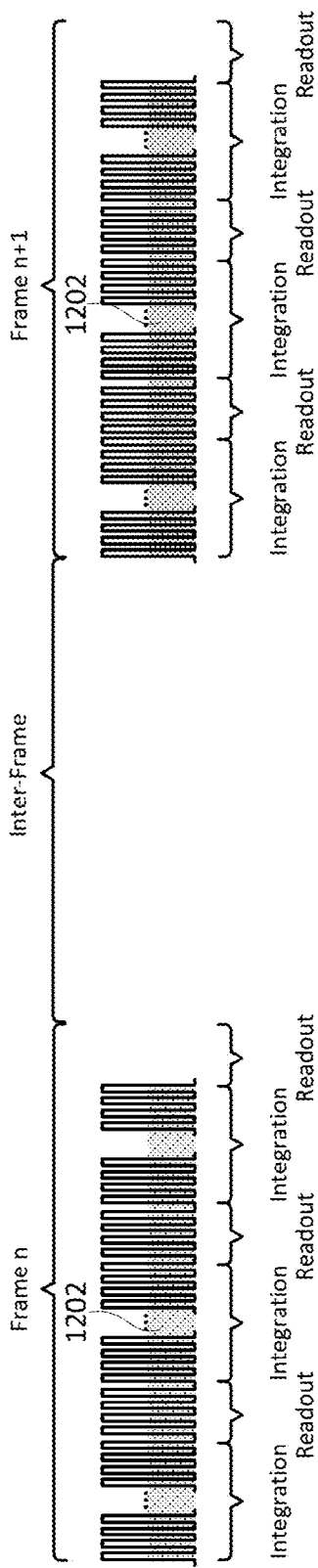
FIG. 12 illustrates an embodiment that reduces how often there are transitions from times during which IR light signals are emitted to times during which the IR light signals are not emitted, and vice versa, to thereby reduce certain frequency content associated with such transitions.

Typically, the RF modulated drive and RF modulated light signals are only produced during the integration periods of frame periods, but are not produced during the readout periods of frame periods, as was shown in FIGS. 7 and 9-11. In accordance with an embodiment, drive and IR light signals are produced during each of the integration periods of each frame period as well as during each of the readout periods between pairs of the integration periods within each frame period, as shown in FIG. 12. This has the effect of reducing how often there are transitions from times during which no light source emits IR light to times during which a light source is driven to emit IR light, and vice versa, and thereby reduces frequency content associated with such transitions. The shaded areas labeled 1202 in FIG. 12 are illustrative of the LF power envelopes of the drive and IR light signals produced using such an embodiment. As can be appreciated from FIG. 12, even though there are multiple integration and readout periods per frame period, there is only one LF power envelope per frame period, and thus only one rising edge of the LF power envelope and only one falling edge of the LF power envelope. In other words, during each frame period, there is only one transition from a time during which no light source emits IR light to a time during which a light source is driven by the drive signal to emit IR light; and there is only one transition from a time during which a light source is driven to emit IR light to a time during which no light source emits IR light. The same light source can be used for emitting IR light during integration periods and readout periods. Alternatively, a first light source (e.g., an IR laser diode) can be used to emit IR light during the integration periods, and a second light source (e.g., an IR LED) can be used to emit IR light during the readout periods. Other variations are also possible, and within the scope of an embodiment.

Figure 13:
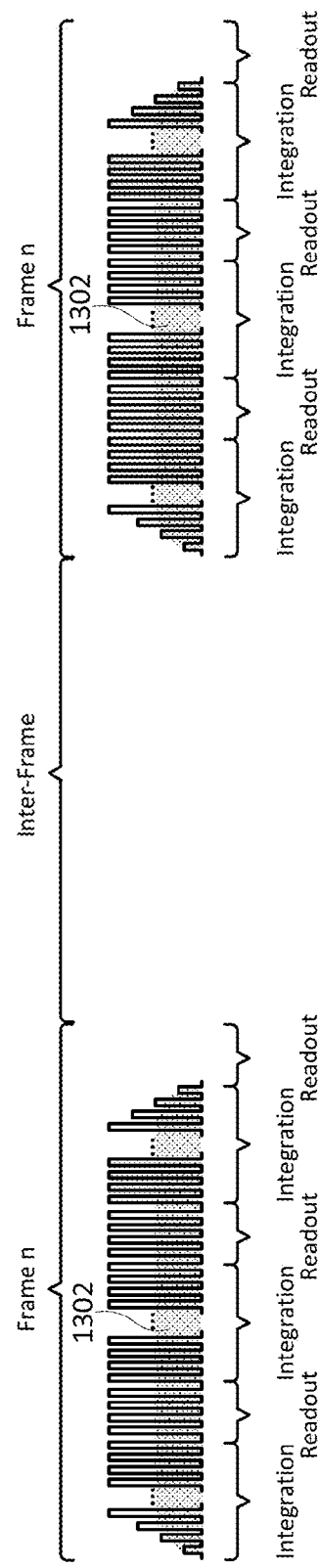
FIG. 13 illustrates an embodiment that combines the embodiments of FIGS. 9 and 12.

The rising and falling edges of the LF power envelope 1202 in FIG. 12 are abrupt, which will result in at least some frequency content within the frequency range known to be used by remote controlled devices and other systems configured to wirelessly receive and respond to IR light signals. To further reduce such frequency content, the embodiment just described with reference to FIG. 12 can be combined with at least one of the previously described embodiments discussed with reference to FIGS. 9-11. For example, FIG. 13 illustrates an embodiment that combines the embodiment described with reference to FIG. 12 with the embodiment described with reference to FIG. 9. The shaded areas labeled 1302 in FIG. 13 are illustrative of the LF power envelopes of the drive signal and the emitted IR light signal produced using such an embodiment. As can be appreciated from FIG. 13, there is only one LF power envelope 1302 per frame period, and thus only one rising edge of the LF power envelope and only one falling edge of the LF power envelope. Additionally, the rising and falling edges of the LF power envelope 1302 in FIG. 13 are smoothed out. Thus, the embodiment described with reference to FIG. 13 achieves the benefits of the embodiment described with reference to FIG. 12 as well as the benefits of the embodiment described with reference to FIG. 9. Alternatively, the embodiment described with reference to FIG. 12 can be combined with one of the embodiments described with reference to FIG. 10 or 11 to achieve similar substantial reductions in frequency content within the frequency range known to be used by remote controlled devices and other systems configured to wirelessly receive and respond to IR light signals.

The embodiments described above can also be combined in other manners. For example, the embodiment described with reference to FIG. 9 can be combined with one or more of the embodiments described with reference to FIGS. 10 and 11. It is also possible that the embodiment described with reference to FIG. 12 can be combined with more than one of the embodiments described with reference to FIGS. 9-11.

In accordance with certain embodiments, where IR light signals are also emitted during readout periods, the readout circuitry (e.g., 270 in FIG. 2B) either does not generate readout signals corresponding to reflected light detected by the image pixel detector array 268 during readout periods, or readout signals corresponding to reflected light detected by the image pixel detector array 268 during readout periods should be ignored by the TOF system. In accordance with alternative embodiments, in order to improve the overall electrical efficiency of the TOF system, the readout circuitry (e.g., 270 in FIG. 2B) generates, and the TOF system utilizes, the readout signals corresponding to reflected IR light detected by the image pixel detector array 268 during readout periods.

Many systems (e.g., televisions or set top boxes) that are configured to wireless receive and respond to IR signals include a receiver that has an automatic gain control (AGC) circuit that adjusts the sensitivity of the receiver in dependence on ambient light conditions. More specifically, such AGC circuits usually decrease gain of a receiver amplifier when there is high ambient light conditions, which makes the receiver less sensitive; and the AGC circuits usually increase the gain of the receiver amplifier when where there is low ambient light conditions, which makes the receiver more sensitive. The more sensitive the receiver, the less need for a direct line of sight between a sub-system that transmit IR signals (e.g., a remote control device that transmits IR remote control signals) and the receiver, which for example, can be built into a television or set top box. Conversely, the less sensitive the receiver, the more need for a direct line of sight between the sub-system (e.g., a remote control device that transmits IR remote control signals) and the receiver. The reason for reducing the amplifier gain during high ambient light conditions is that the reduction in gain makes the receiver less sensitive to interference resulting from ambient light. Experiments have shown that reducing the gain of a receiver amplifier also has the effect of making the receiver less sensitive to interference resulting from RF component of IR light produced by a TOF system. An embodiment of the present technology, which shall now be described with reference to FIG. 14, purposely reduces the receiver amplifier gain (even during low ambient light conditions) in order to make a receiver (e.g., a remote control receiver) less sensitive to interference resulting from IR light produced by a TOF system.

Figure 14:
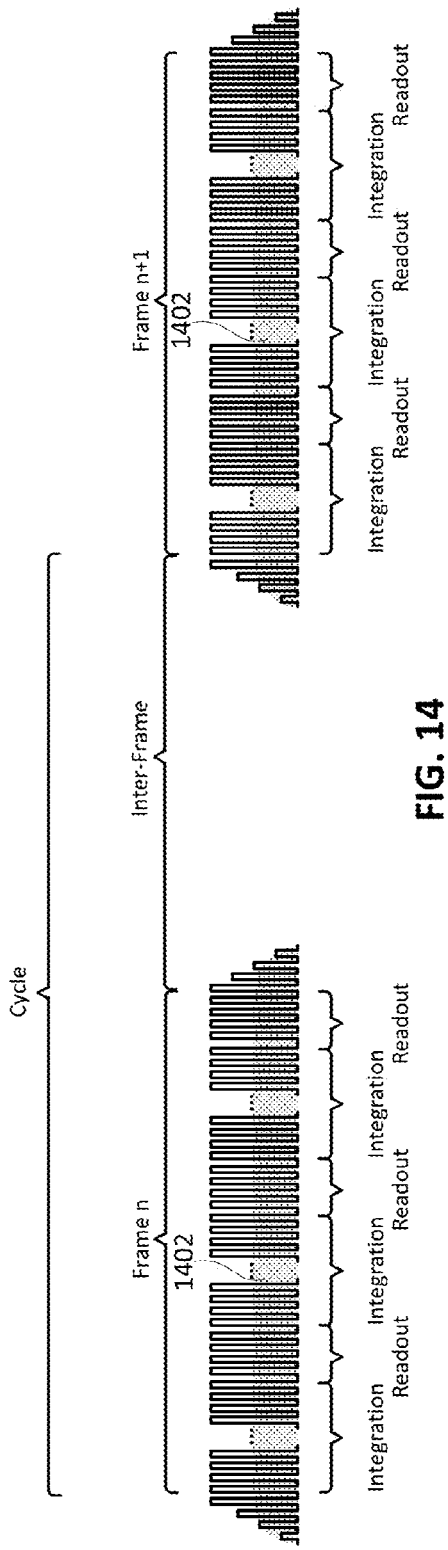
FIG. 14 illustrates an embodiment that decreases a gain level set by an automatic gain control (AGC) circuit associated with a receiver of another system in close proximity to a TOF system, and thereby, makes the receiver of the other system less susceptible to interference from the TOF system.

The AGC circuit of a receiver may, for example, have about 50 dB of adjustable gain. Such an AGC circuit automatically varies the gain of a receiver amplifier between its minimum gain (in a bright environment) and its maximum gain (in a dark environment). In accordance with an embodiments, in order to decrease the sensitivity of an AGC circuit of another system (e.g., a system that is configured to wirelessly receive and respond to IR remote control signals) and thereby make the other system less susceptible to interference from the TOF system, the driver (e.g., 250) of a TOF system drives a light source (e.g., 250) of the TOF system to cause IR light to also be emitted during the readout periods between pairs of the integration periods within each frame period and during at least a portion of the inter-frame periods between pairs of frames. In other words, the TOF system purposely increases the percentage of each frame period during with IR light is emitted, as shown in FIG. 14. This causes an AGC circuit of another system (e.g., a television) within close proximity to the TOF system to reduce its level of gain, making the receiver of the other system less susceptible to interference from the TOF system. As can be appreciated from FIG. 14, the width of the LF power envelope 1402 can be made greater than the width of the frame period by emitting IR light during portions of the adjacent inter-frame periods. In other words, the TOF system may emit IR light during at least of portion of inter-frame periods, which is not typically done. As can be appreciated from FIG. 14, this embodiment can be combined with previously described embodiments. For example, in FIG. 14, the pulse amplitudes are ramped up and down in the manner originally described with reference to FIG. 9 to smooth out the LF power envelope; and the pulses are also generated during readout periods to reduce the number of LF power envelope transitions as was originally described with reference to FIG. 12. The same light source can be used for emitting IR light during integration periods, the readout periods and portions of the inter-frame periods. Alternatively, a first light source (e.g., an IR laser diode) can be used to emit IR light during the integration periods, and a second light source (e.g., an IR LED) can be used to emit IR light during the readout periods and portions of the inter-frame periods. Other variations are also possible, and within the scope of an embodiment.

Figure 15:
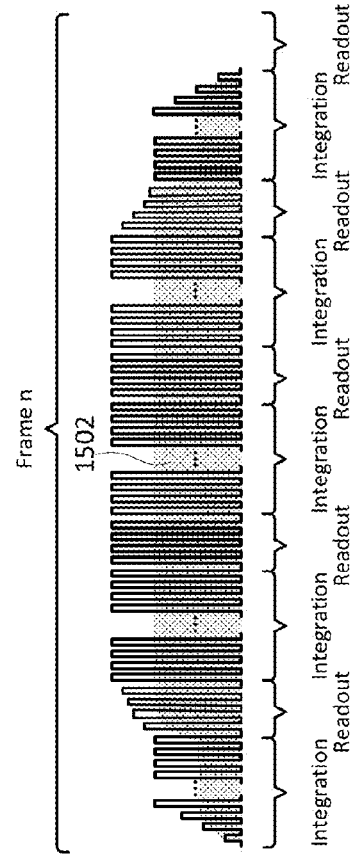
FIG. 15 illustrates an additional technique for smoothing out LF power envelopes in accordance with an embodiment.

In FIGS. 9-14, the pulse amplitudes within the middle integration period(s) of a frame period were shown as staying the same. However, this need not be the case. For example, the pulse amplitudes may change from one integration period to the next. In order to reduce frequency content resulting from such abrupt relatively significant changes in pulse amplitudes, it is advantageous to produce RF modulated drive and RF modulated light signals during the readout periods (between such integration periods) and smooth out the changes in the pulse amplitudes, as can be appreciated from FIG. 15. More generally, FIG. 15 illustrates a smoothing out of all transitions of the LF power envelope 1502. The embodiment described with reference to FIG. 15 can be combined with one or more of the previously described embodiments. For example, instead of ramping up and down pulse amplitude to smooth out the LF power envelope 1502, ramping up and down of pulse duty cycles, temporal gaps and/or how often gaps occur between adjacent pulses or pulse trains can be used to smooth out the LF power envelope 1502.

Figure 16:
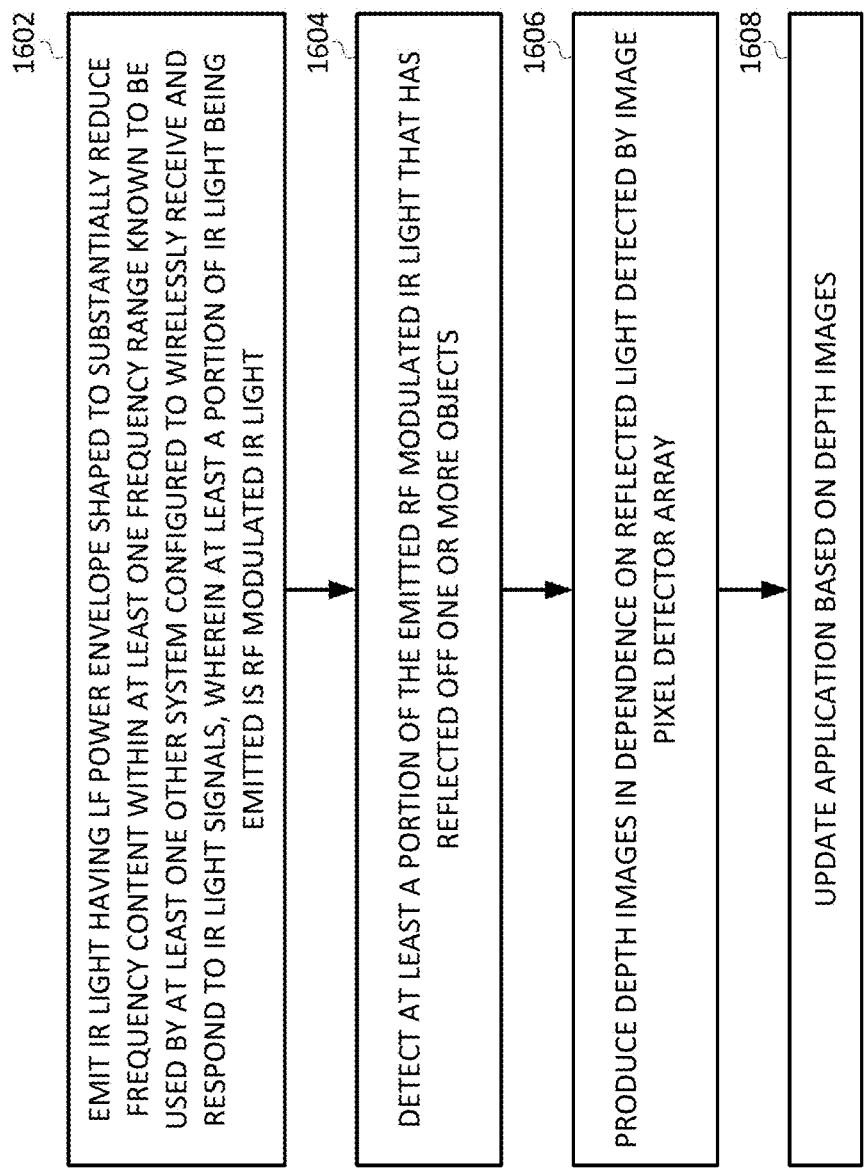
FIG. 16 is a high level flow diagram that is used to summarize methods according to various embodiments of the present technology.

The high level flow diagram of FIG. 16 will now be used to summarize methods according to various embodiments of the present technology. Such methods, which are for use by a TOF system, are for substantially reducing interference that the TOF system may cause to a further device that is configured to wirelessly receive and respond to IR signals transmitted by a remote control device that is intended to remotely control the further device (e.g., a television).

Referring to FIG. 16, step 1602 involves emitting IR light having a LF power envelope that is shaped to substantially reduce frequency content within at least one frequency range known to be used by at least one other system configured to wirelessly receive and respond to IR light signals, wherein at least a portion of IR light being emitted is RF modulated IR light. Frequency ranges within which frequency content can be reduced using embodiments described herein include, but are not limited to: 10 kHz-100 kHz frequencies that are used by some systems for sending IR remote control signals; 455 kHz (+/−10%) and/or 1 MHz (+/−10%) frequencies that are used by other systems for sending IR remote control signals; 2.3 MHz (+/−10%) and 2.8 MHz (+/−10%) frequencies that are used by some systems for transmitting IR signals to wireless IR headphones; and 25 KHz-30 KHz frequencies that are used by some systems for transmitting IR signals to wireless 3D shutter glasses.

Still referring to FIG. 16, step 1604 involves detecting at least a portion of the emitted RF modulated IR light that has reflected off one or more objects. At step 1606, depth images are produced in dependence on results of the detecting. At step 1608, the depth images are used to update an application. For example, depth images can be used to tracked motion and/or other user behavior, which can be used, e.g., to manipulate a game character or other aspects of the application in response to movement of a user's body and/or objects around the user, rather than (or in addition to) using controllers, remotes, keyboards, mice, or the like. For example, a video game system can update the position of images displayed in a video game based on the new positions of the objects or update an avatar based on motion of the user as detected based on depth images.

As was discussed above with reference to FIG. 9, step 1602 can involve ramping up pulse amplitudes of the RF component of a drive signal when transitioning from a time during which no light source is driven to emit IR light to a time during which a light source is driven by the drive signal to emit IR light, and ramping down pulse amplitudes of the RF component of the drive signal when transitioning from a time during which the light source is driven by the drive signal to emit IR light to a time during which no light source is driven to emit IR light. This will result in similar ramping up and ramping down of pulse amplitudes of the light pulses emitted by the light source.

As was discussed above with reference to FIG. 10, step 1602 can involve ramping up pulse duty cycles of the RF component of a drive signal when transitioning from a time during which no light source is driven to emit IR light to a time during which a light source is driven by the drive signal to emit IR light, and ramping down pulse duty cycles of the RF component of the drive signal when transitioning from a time during which the light source is driven by the drive signal to emit IR light to a time during which no light source is driven to emit IR light. This will result in similar ramping up and ramping down of pulse duty cycles of the light pulses emitted by the light source.

As was discussed above with reference to FIG. 11, step 1602 can involve ramping down temporal gaps and/or how often gaps occur between adjacent pulses or pulse trains of the RF component of a drive signal when transitioning from a time during which no light source is driven to emit IR light to a time during which a light source is driven by the drive signal to emit IR light, and ramping up temporal gaps and/or how often gaps occur between adjacent pulses or pulse trains of the RF component of the drive signal when transitioning from a time during which a light source is driven by the drive signal to emit IR light to a time during which no light source is driven to emit IR light. This will result in similar ramping down and ramping up of temporal gaps and/or how often gaps occur between light pulses or pulse trains emitted by the light source.

As was discussed above with reference to FIG. 12, step 1602 can involve emitting IR light during integration periods of each frame period as well as during each of the readout periods between pairs of the integration periods within each frame period. Such an embodiment reduces how often there are transitions from times during which IR light is emitted to times during which IR light is not emitted, and vice versa, thereby reducing frequency content associated with such transitions. In certain embodiments, discussed above with reference to FIG. 14, IR light can also be emitted during portions of inter-frame periods.

Additional details of various methods of the present technology can be appreciated from the above discussion of FIGS. 9-15.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the technology be defined by the claims appended hereto.

What is claimed is:
1. For use by a time-of-flight (TOF) system that emits and detects infrared (IR) light, a method for substantially reducing interference that the TOF system may cause to at least one non-TOF system that is configured to wirelessly receive and respond to IR light remote control signals, the method comprising:

producing a radio frequency (RF) modulated drive signal;

driving an IR light source with the RF modulated drive signal;

in response to the driving emitting IR light having a low frequency (LF) power envelope that is shaped to substantially reduce frequency content within at least a frequency range from 10 kHz to 100 kHz that is available for use by at least one non-TOF system configured to wirelessly receive and respond to IR light remote control signals, wherein at least a portion of IR light being emitted by the TOF system is RF modulated IR light having a carrier frequency of at least 5 MHz; and detecting at least a portion of the emitted RF modulated IR light that has reflected off one or more objects;

wherein the producing the RF modulated drive signal includes, when transitioning from a period that the drive signal does not include pulses to a period that the drive signal includes pulses, at least one of
incrementally ramping up pulse amplitudes of the drive signal,
incrementally ramping up pulse duty cycles of the drive signal,
incrementally ramping down temporal gaps between pulses or pulse trains of the drive signal, or
incrementally ramping down how often gaps occur between pulses or pulse trains of the drive signal.

2. The method of claim 1, wherein the emitting IR light comprises:

emitting IR light having a LF power envelope that is shaped to substantially reduce frequency content within at least two frequency ranges below 3 MHz that are available for use by non-TOF systems configured to wirelessly receive and respond to IR light signals, wherein one of the at least two frequency ranges is the frequency range from 10 kHz to 100 kHz.

3. The method of claim 1, wherein:

the TOF system is configured to obtain a separate depth image corresponding to each of a plurality of frame periods, each frame period is followed by an inter-frame period, each frame period includes at least two integration periods, and each integration period is followed by a readout period; and the emitting IR light includes emitting IR light during each of the integration periods; and to reduce how often there are transitions from times during which IR light is being emitted and times during which IR light is not being emitted, and thereby reduce frequency content associated with the transitions, the emitting IR light also includes emitting IR light during the readout periods between pairs of the integration periods within each frame period.

4. The method of claim 1, wherein:

the TOF system is configured to obtain a separate depth image corresponding to each of a plurality of frame periods, each frame period is followed by an inter-frame period, each frame period includes at least two integration periods, and each integration period is followed by a readout period; and the emitting IR light includes emitting IR light during each of the integration periods; and in order to decrease a gain level of an automatic gain control (AGC) circuit for use with an IR light receiver of at least one non-TOF system configured to wirelessly receive and respond to IR light remote control signals, and thereby make the IR light receiver of the at least one non-TOF system less sensitive to interference from the TOF system, the emitting IR light also includes emitting IR light during at least a portion at least one of:

(i) the readout periods between pairs of the integration periods within each frame period, or (ii) the inter-frame periods between pairs of frames.

5. The method of claim 1, further comprising:

producing depth images in dependence on results of the detecting the at least a portion of the emitted RF modulated IR light that has reflected off one or more objects; and updating an application in dependence on the depth images.

6. The method of claim 1, wherein:

the producing the RF modulated drive signal includes, when transitioning from a period that the drive signal includes pulses to a period that the drive signal does not include pulses, at least one of
incrementally ramping down pulse amplitudes of the drive signal,
incrementally ramping down pulse duty cycles of the drive signal,
incrementally ramping up temporal gaps between pulses or pulse trains of the drive signal, or
incrementally ramping up how often gaps occur between pulses or pulse trains of the drive signal.

7. The method of claim 6, wherein the producing the RF modulated drive signal comprises:

incrementally ramping up pulse duty cycles of the drive signal when transitioning from a said period that the drive signal does not include pulses to a said period that the drive signal includes pulses; and incrementally ramping down pulse duty cycles of the drive signal when transitioning from a said period that the drive signal includes pulses to a said period that the drive signal does not include pulses.

8. The method of claim 5, wherein:

the incrementally ramping up the pulse amplitudes of the drive signal occurs over at least 50 µsec; and the incrementally ramping down the pulse amplitudes of the drive signal occurs over at least 50 µsec.

9. The method of claim 6, wherein the producing the RF modulated drive signal comprises:

incrementally ramping up pulse duty cycles of the drive signal over a period of at least 50 µsec when transitioning from a said period that the drive signal does not include pulses to a said period that the drive signal includes pulses; and incrementally ramping down pulse duty cycles of the drive signal over a period of at least 50 µsec when transitioning from a said period that the drive signal includes pulses to a said period that the drive signal does not include pulses.

10. The method of claim 6, wherein the producing the RF modulated drive signal comprises:

incrementally ramping down temporal gaps between pulses or pulse trains of the drive signal over a period of at least 50 µsec when transitioning from a said period that the drive signal does not include pulses to a said period that the drive signal includes pulses; and incrementally ramping up temporal gaps between pulses or pulse trains of the drive signal over a period of at least 50 μsec when transitioning from a said period that the drive signal includes pulses to a said period that the drive signal does not include pulses.

11. The method of claim 6, wherein the producing the RF modulated drive signal comprises:

incrementally ramping down how often gaps occur between pulses or pulse trains of the drive signal over a period of at least 50 μsec when transitioning from a said period that the drive signal does not include pulses to a said period that the drive signal includes pulses; and incrementally ramping up how often gaps occur between pulses or pulse trains of the drive signal over a period of at least 50 μsec when transitioning from a said period that the drive signal includes pulses to a said period that the drive signal does not include pulses.

12. A time-of-flight (TOF) system, comprising:

at least one light source configured to emit infrared (IR) light in response to be driven;

a driver configured to produce a radio frequency (RF) modulated drive signal and drive the at least one light source with the RF modulate drive signal to thereby cause the at least one light source to emit IR light having a low frequency (LF) power envelope that is shaped to substantially reduce frequency content within at least a frequency range from 10 kHz to 100 kHz that is available for use by at least one non-TOF system configured to wirelessly receive and respond to IR light remote control signals, wherein at least a portion of IR light emitted in response to the driver driving the at least one light source with the RF modulated drive signal is RF modulated IR light having a carrier frequency of at least 5 MHz;

a clock signal generator configured to produce a clock signal that is provided to the driver;

a processor configured to control at least one of the clock signal generator or the driver; and an image pixel detector array configured to detect at least a portion of the emitted RF modulated IR light that has reflected off one or more objects and is incident on an image pixel detector array;

wherein at least one of the processor, the clock signal generator or the driver is/are configured to cause the emitted RF modulated IR light to include, when transitioning from a period when RF modulated IR light is not emitted to a period when RF modulated IR light is emitted, at least one of pulses having amplitudes that incrementally ramp up,
pulses having duty cycles that incrementally ramp up,
pulses or pulse trains having temporal gaps that incrementally ramp down, or
pulses or pulse trains where how often gaps occur between the pulses or pulse trains incrementally ramp down.

13. The system of claim 12, wherein:

the TOF system is configured to obtain a separate depth image corresponding to each of a plurality of frame periods,
each frame period is followed by an inter-frame period,
each frame period includes at least two integration periods, and
each integration period is followed by a readout period; and the driver is configured to drive a said light source to emit IR light during each of the integration periods;

the driver is configured to drive a said light source to emit IR light during the readout periods between pairs of the integration periods within each frame period, in order to reduce how often there are transitions from times during which IR light is being emitted and times during which IR light is not being emitted, and thereby reduce frequency content associated with the transitions; and the light source driven to emit IR light during the readout periods can be the same or different than the light source driven to emit IR light during the integration periods.

14. The system of claim 12, wherein:

the TOF system is configured to obtain a separate depth image corresponding to each of a plurality of frame periods,
each frame period is followed by an inter-frame period,
each frame period includes at least two integration periods, and
each integration period is followed by a readout period; and the driver is configured to drive a said light source to emit IR light during each of the integration periods;

the driver is configured to drive a said light source to emit IR light during at least a portion at least one of (i) the readout periods between pairs of the integration periods within each frame period or (ii) the inter-frame periods between pairs of frames, in order to decrease a gain level of an automatic gain control (AGC) circuit for use with an IR light receiver of at least one non-TOF system configured to wirelessly receive and respond to IR light remote control signals, and thereby make the IR light receiver of the at least one non-TOF system less sensitive to interference from the TOF system; and the light source that is driven to emit IR light during at least a portion at least one of (i) the readout periods between pairs of the integration periods within each frame period or (ii) the inter-frame periods between pairs of frames, can be the same as or different than the light source driven to emit IR light during the integration periods.

15. The system of claim 12, wherein:

at least one of the processor, the clock signal generator or the driver is/are configured to cause the emitted RF modulated light to include, when transitioning from a period when RF modulated light is emitted to a period when RF modulated light is not emitted, at least one of pulses having amplitudes that incrementally ramp down,
pulses having duty cycles that incrementally ramp down,
pulses or pulse trains having temporal gaps that incrementally ramp up, or
pulses or pulse trains where how often gaps occur between the pulses or pulse trains incrementally ramp up.

16. The system of claim 15, wherein at least one of the processor, the clock signal generator or the driver is/are configured to:

incrementally ramp up pulse amplitudes of the drive signal when transitioning from a time during which no IR light is emitted to a time during which IR light is emitted; and incrementally ramp down pulse amplitudes of the drive signal when transitioning from a time during which IR light is emitted to a time during which no IR light is emitted.

17. The system of claim 15, wherein at least one of the processor, the clock signal generator or the driver is/are configured to:
  incrementally ramp up pulse duty cycles of the drive signal when transitioning from a time during which no IR light is emitted to a time during which IR light is emitted; and
  incrementally ramp down pulse duty cycles of the drive signal when transitioning from a time during which IR light is emitted to a time during which no IR light is emitted.

18. The system of claim 15, wherein at least one of the processor, the clock signal generator or the driver is/are configured to:
  incrementally ramp down temporal gaps between, or how often gaps occur between, pulses or pulse trains of the drive signal when transitioning from a time during which no IR light is emitted to a time during which IR light is emitted; and
  incrementally ramp up temporal gaps between, or how often gaps occur between, pulses or pulse trains of the drive signal when transitioning from a time during which IR light is emitted to a time during which no IR light is emitted.

19. One or more hardware storage devices having instructions encoded thereon which when executed cause one or more processors to perform a method for substantially reducing interference that a time-of flight (TOF) system may cause to at least one non-TOF system that is configured to wirelessly receive and respond to infrared (IR) light remote control signals, the method comprising:
  producing a radio frequency (RF) modulated drive signal that drives at least one light source of the TOF system to emit IR light having a carrier frequency of at least 5 MHz and having a low frequency (LF) power envelope that is shaped to substantially reduce frequency content within at least a frequency range from 10 kHz to 100 kHz that is available for use by at least one non-TOF system configured to wirelessly receive and respond to IR light remote control signals;
  producing depth images in dependence on portions of emitted IR light that have reflected off one or more objects and are detected by an image pixel detector array of the TOF system; and
  updating an application in dependence on the depth images;
  wherein the producing the RF modulated drive signal includes, when transitioning from a period that the drive signal does not include pulses to a period that the drive signal includes pulses, at least one of
    incrementally ramping up pulse amplitudes of the drive signal,
    incrementally ramping up pulse duty cycles of the drive signal,
    incrementally ramping down temporal gaps between pulses or pulse trains of the drive signal, or
    incrementally ramping down how often gaps occur between pulses or pulse trains of the drive signal.

20. The one or more hardware storage devices of claim 19, wherein:
  the producing the drive signal includes, when transitioning from a period that the drive signal includes pulses to a period that the drive signal does not include pulses, at least one of
    incrementally ramping down pulse amplitudes of the drive signal,
    incrementally ramping down pulse duty cycles of the drive signal,
    incrementally ramping up temporal gaps between pulses or pulse trains of the drive signal, or
    incrementally ramping up how often gaps occur between pulses or pulse trains of the drive signal.

* * * * *